United States Patent
Khandkar et al.

(10) Patent No.: US 11,461,122 B2
(45) Date of Patent: *Oct. 4, 2022

(54) STREAMING DATABASE CLONING USING CLUSTER LIVE MOUNTS

(71) Applicant: Rubrik, Inc., Palo Alto, CA (US)

(72) Inventors: Snehal Khandkar, Palo Alto, CA (US); Udbhav Prasad, Mountain View, CA (US); Ganesh Karuppur Rajagopalan, Los Gatos, CA (US); Yongbing Eric Guo, Saratoga, CA (US)

(73) Assignee: Rubrik, Inc., Palo Alto, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 16/527,902

(22) Filed: Jul. 31, 2019

(65) Prior Publication Data

US 2021/0034398 A1    Feb. 4, 2021

(51) Int. Cl.
| | |
|---|---|
| *G06F 9/46* | (2006.01) |
| *G06F 9/455* | (2018.01) |
| *G06F 11/14* | (2006.01) |
| *H04L 67/00* | (2022.01) |

(52) U.S. Cl.
CPC ...... *G06F 9/45558* (2013.01); *G06F 11/1464* (2013.01); *G06F 11/1471* (2013.01); *G06F 11/1492* (2013.01); *H04L 67/34* (2013.01); *G06F 2009/4557* (2013.01); *G06F 2009/45562* (2013.01)

(58) Field of Classification Search
CPC ............ G06F 9/45558; G06F 11/1464; G06F 11/1471; G06F 11/1492; G06F 2009/45562; G06F 2009/4557; H04L 67/34

See application file for complete search history.

(56) References Cited

U.S. PATENT DOCUMENTS

2014/0325267 A1   10/2014   Liu et al.
2018/0285353 A1*  10/2018   Ramohalli Gopala Rao ............... G06F 9/45558

* cited by examiner

*Primary Examiner* — Wissam Rashid
(74) *Attorney, Agent, or Firm* — Holland & Hart LLP

(57) ABSTRACT

A database can be instantly cloned from a source device to a target device by a cluster mapped to a database to be cloned. Nodes of the cluster are mapped over channels to directories of the database. Scripts are generated from one or more templates that specify the order and values to be executed to perform a database job, such as cloning the database to the target device using the mappings. To clone the database, a template can be executed that generates and populates scripts, which can be executed on the target device to provide a functioning cloned database using the mapped cluster.

20 Claims, 20 Drawing Sheets

STREAMING DATABASE CLONING USING CLUSTER LIVE MOUNTS

TECHNICAL FIELD

The present disclosure generally relates to special-purpose machines that manage database processes and improvements to such variants, and to the technologies by which such special-purpose machines become improved compared to other special-purpose machines for performing database file management.

BACKGROUND

Some conventional database cloning approaches require moving large files back and forth between a source host and a target host. The moving of files to clone a database is slow and creates a large network overhead and lengthy cloning times.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1A:
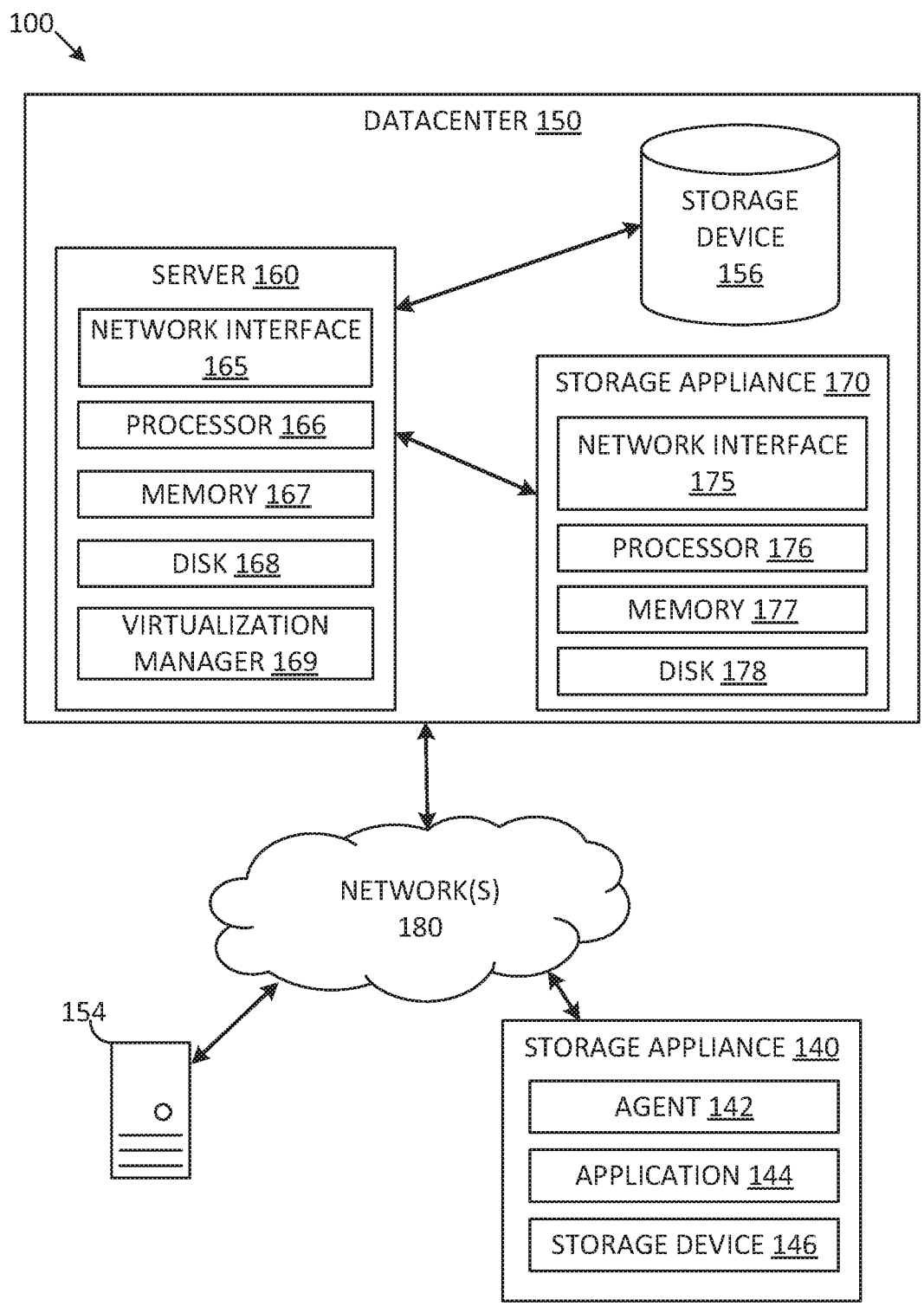
FIG. 1A depicts a networked computing environment in which the disclosed technology may be practiced, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Sometimes databases fail and need to be restored. For example, a database may become corrupt, hacked, or the physical equipment upon which the database runs is damaged (e.g., a standalone host upon which a database is running is damaged by a wildfire). In such cases, database administrators seek to recover the database by moving files from a backup location (e.g., a backup server) to the downed database location (e.g., to a production server or host). The length of time it takes to recover the database from the backup location can increase as the amount of data to be recovered increases. In some cases, the database is a critical database and the network cannot tolerate more than a few minutes of downtime before one or more network services experience significant performance delays. Preferably, a downed database would be instantly recovered however, as mentioned, migrating files from a backup location may take a long time to complete.

To this end, a cluster-based database system can implement instant recovery of relational databases by live mounting directories to a plurality of nodes in a cluster of a distributed database. Each node of the cluster may service one or more channels of the downed host. As used here, the term host refers to a database system (e.g., standalone host) or a plurality of hosts running copies of a database in a replicative arrangement, and other database arrangements are likewise possible. In some example embodiments, the cluster-based database system first configures a cluster to which data files of the database are stored via live mounts to nodes of the cluster. After the nodes are configured to manage the data files, a plurality of directories is mounted on the host, where each of the directories is live mounted to a node of the cluster. In some example embodiments, the cluster comprises four or more nodes, each of which manages one or more directories of a host database. For example, a first node can manage files of a "channel 0" directory of the database, including data file 1, data file 2, and a control file; further, a second node can manage files of a "channel 1" directory, including data file 3, data file 4, and so on. In some example embodiments, the cluster is configured with a default value of nodes (e.g., three file nodes, one script node) and additional nodes can be added to the cluster to manage additional directories or increase overall performance per a performance setting, such as a service level agreement (SLA). For example, if the database to be instantly restored via the cluster is large (e.g., large file sizes, large overall data amount stored), the cluster node quantity can be increased to 40 nodes, each of which manages channel directories in a distributed way to achieve specific performance or service level agreement (SLA) goals of the production database. In some example embodiments, at least one of the nodes in the cluster stores a script directory, which manages script data. The script data can include one or more templates, where a given template can be executed to generate a plurality of scripts in a sequence to complete a database job, such as instant recovery.

In some example embodiments, after configuration of the cluster for instant recovery, the host (e.g., standalone database, multiple database instances) is configured to function with the cluster nodes. In some example embodiments, the host creates as many directories are there are channels of the database. Each of the directories on the host are mapped to one of the nodes in the cluster. In some example embodiments, the host directories are mapped to cluster directories via Network File System mounting. For example, the path of a first directory on the host (e.g., /A/B/C0 for Channel 0) will map to a first node that is managing channel 0; likewise, another path for a second directory on the host (e.g., /A/B/C1 for channel 1) will map to a second node that is managing data for channel 1, and so on. In this way, the files are materialized on the cluster and not on the host, and recovery is instant or near instant because no large files need to be migrated to the host in order to bring up the database. Instead, the host can utilize the NFS mounted channels managed by the different remote nodes to provide an instant recovery experience.

In some example embodiments, a remote connector agent of the cluster is installed on the host to manage data between the cluster and the host. In some example embodiments, the remote connector agent is first installed on the host before the live mounts to the cluster are configured. The remote connector agent has permissions and authorizations on the host to create and mountable directories and execute scripts. Further, according to some example embodiments, the remote connector agent is coupled to the script node via mounting. In some example embodiments, the remote connector agent is a plugin or extension of the database management system (DBMS) installed on the host. For example, the database management system can be an Oracle database management application (e.g., relational database system), and the remote connector agent is a plugin or extension of the Oracle database management application with permission to listen to events data and transmit the events/parameters data back to the cluster, and further with permissions to read/write data, generate database (DB) instances, generate directories, mount network targets to the directories, and other actions, such application of redo logs to database files.

In some example embodiments, upon instant recovery being initiated, the remote connector agent identifies the script directory node and executes the scripts on the host to instantly recover the host database. In some example embodiments, the script directory on the node includes one or more templates an execution sequence of the scripts (e.g., script code portions). A template is pre-configured with placeholder values into which parameters and settings are populated when the template is used to generate the scripts.

A script template can be preconfigured for a type of database job to be performed via the live mounted cluster. For example, in the standalone host scenario, a script template may be configured to generate a first script that creates the directories on the host, followed by a second script to create a host database instance (e.g., an Oracle bare bones database instance), followed by a third script that performs instant recovery of files (e.g., live mounting of data files and application of log files to the data files to bring them to the latest state).

Each script (e.g., script portion) can be used in different templates for different jobs. For example, an instant recovery template and a target cloning template (which are templates for different jobs) may both use the create directories script (e.g., script code portion). The database user e.g., a database administrator) is not required to generate or customize script code and the entire database job (e.g., instant recovery, live mounting) is preconfigured using scripts, which can be generated by templates and executed on the fly when needed. In this way, for example, if a database goes down and needs to be recovered, the database user can rely on the pre-configured scripts and templates to bring a cluster supported version of the database back up instantly, instead of manually drafting scripts to execute to manually recovery the database.

FIG. 1A depicts one embodiment of a networked computing environment 100 in which the disclosed technology may be practiced. As depicted, the networked computing environment 100 includes a datacenter 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a work station, a laptop computer, a tablet computer, a desktop computer, or an information processing system. The other storage devices may include, for example, a storage area network storage device, a networked-attached storage device, a hard disk drive, a solid-state drive, or a data storage system.

The datacenter 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for hacking up virtual machines and/or files within a virtualized infrastructure. The server 160 may be used to create and manage one or more virtual machines associated with a virtualized infrastructure.

The one or more virtual machines may run various applications, such as a database application or a web server (e.g., a web server hosting an auto-parts website). The storage device 156 may include one or more hardware storage devices for storing data, such as a hard disk drive (HDD), a magnetic tape drive, a solid-state drive (SSD), a storage area network (SAN) storage device, or a networked attached storage (NAS) device in some cases, a data center, such as datacenter 150, may include thousands of servers and/or data storage devices in communication with each other. The data storage devices may comprise a tiered data storage infrastructure (or a portion of a tiered data storage infrastructure) The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160 (e.g., In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer-readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance (e.g., agent installed on the storage appliance), such as storage appliance 140 or storage appliance 170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at a point in time is frozen) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual-machine-related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154.

The storage appliance 140 may comprise a cloud-based data management system for backing up virtual machines and/or files within a virtualized infrastructure, such as virtual machines running on server 160 or files stored on server 160 (e.g., locally stored files, files stored in mounted directories), according to some example embodiments.

In some cases, networked computing environment 100 may provide remote access to secure applications and files stored within datacenter 150 from a remote computing device, such as computing device 154. The datacenter 150 may use an access control application to manage remote access to protected resources, such as protected applications, databases, or files located within the datacenter 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point-in-time versions of one or more virtual machines running within the datacenter 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. A user (e.g., database administrator) of the storage appliance 170 may then select the particular version to be mounted and run an application (e.g., a data analytics application) using the mounted version of the virtual machine. In another example, the particular version may be mounted as an iSCSI target.

In some example embodiments, the storage appliance 140 is an external network connected database appliance comprising an agent 142, an application 144, and a storage device. In some example embodiments, the application 144 is a database application for managing a database (e.g., Oracle database management system) that can store database data locally on storage device 146, or on remote storage locations, such as within datacenter 150. The agent 142 is a remote connection system for performing snapshots of database data (e.g., databases managed application 144), and can further implement bootstrapping, upgrade, and further include backup features to transfer data from the storage appliance 140 to datacenter 150 via networks 180.

In some example embodiments, the agent 142 can be uploaded from the datacenter 150 and installed on the storage appliance 140. After installation on storage application 140, the agent 142 can be enabled or disabled by the storage appliance 140 over time. The agent 142 may acquire one or more electronic files or snapshot information associated with the one or more electronic files from the application 144. The snapshot information may include full and/or differential snapshot data. In one example, the one or more electronic files may comprise a database file for a database and the snapshot information may comprise a differential backup of the database file.

Int those embodiments in which the application 144 is a database application that manages a database, the agent 142 is configured to acquire one or more electronic files corresponding with a first point in time version of the database from the database application. The agent 142 can further acquire a database file for the database from the application 144 or acquire a full or differential backup of the database from the computing application 144. The determination of whether the agent 142 acquires the database file or the full or differential backup may depend on a file size of the database file. The database file may comprise a text file or a binary file. The agent 142 may transfer one or more changed data blocks corresponding with the first point in time version of the database to the storage appliance 140. The one or more changed data blocks may be identified by the agent 142 by generating and comparing fingerprints or signatures for data blocks of the database file with previously generated fingerprints or signatures associated with earlier point in time versions of the database file captured prior to the first point in time. In some example embodiments, the agent 142 can perform automatical upgrades or downgrades the agent 142 to be in-sync with software changes to a plurality of nodes (e.g., nodes operating within storage appliance 170).

In some example embodiments, the agent 142 is further configured to interface with application 144 or storage device 146 to implement changes, such as creating directories, database instances, reads/writes, and other operations to provide database management functions between the storage appliance 140 and devices within datacenter 150. For example, the application 144 can be a relational database management application with plugin functionality, in which third-party developed plugins or extensions can be integrated in the application 144 to perform actions, such as creation of a database instance.

Figure 1B:
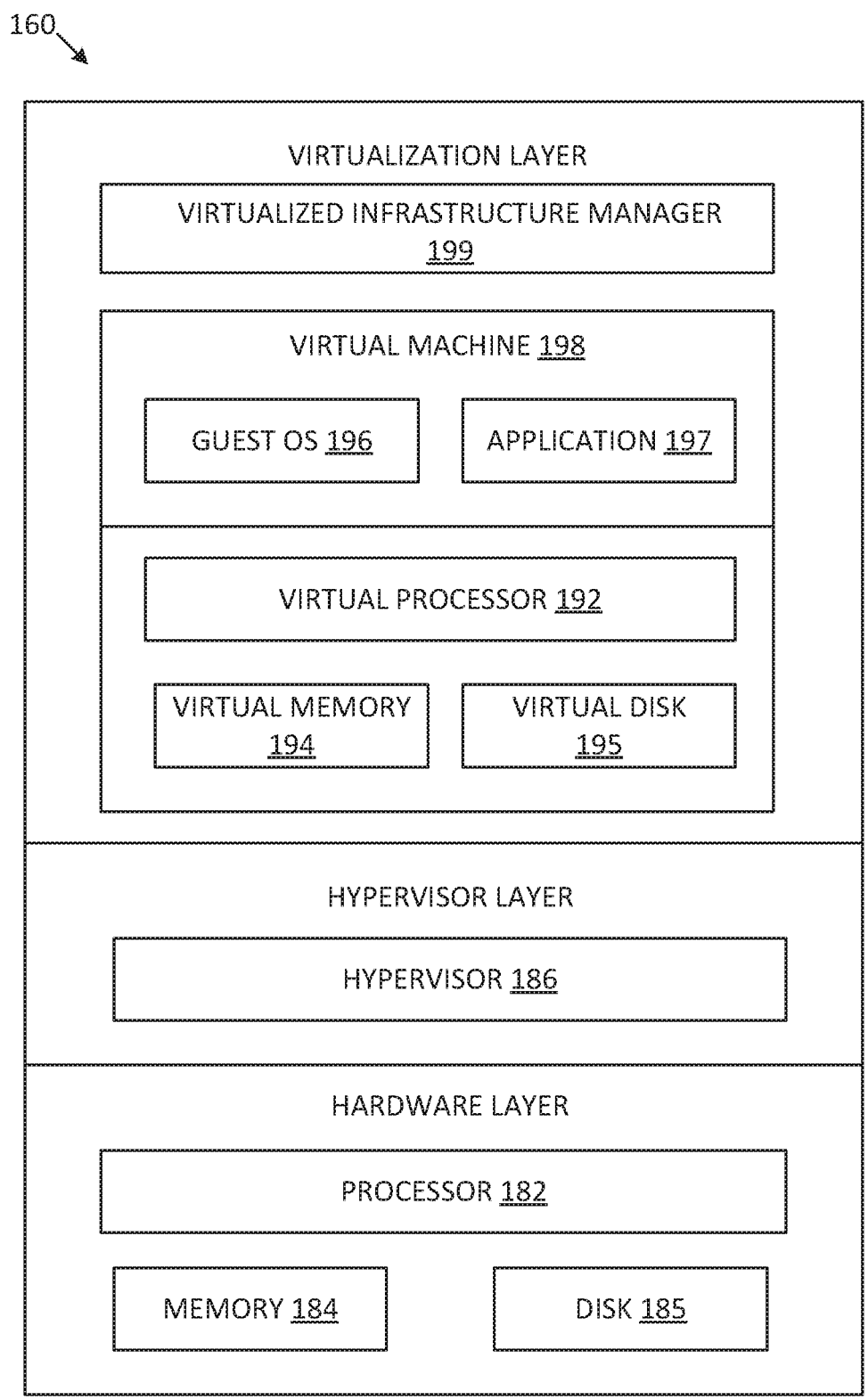
FIG. 1B depicts a server of a networked computing environment, according to some example embodiments.

FIG. 1B depicts one embodiment of server 160 in FIG. 1A. The server 160 may comprise one server out of a plurality of servers that are networked together within a data center. In one example, the plurality of servers may be positioned within one or more server racks within the datacenter 150. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure-related tasks, such as cloning virtual machines, creating new virtual machines (e.g., new virtual machines for new nodes of the cluster monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server 160. The distributed file system protocol may allow the server 160 or the hypervisor 186 to mount a directory or a portion of a file system located within the storage appliance 140. For example, the storage appliance 140 can include a standalone host of a database, where the server 160 mounts the database directories as if the files were locally stored on server 160. Further, the server 160 may function as a backup device for storage appliance 140 by backing up data in the mounted directories in a distributed database within datacenter 150, such as a cluster of nodes in storage appliance 170.

Figure 1C:
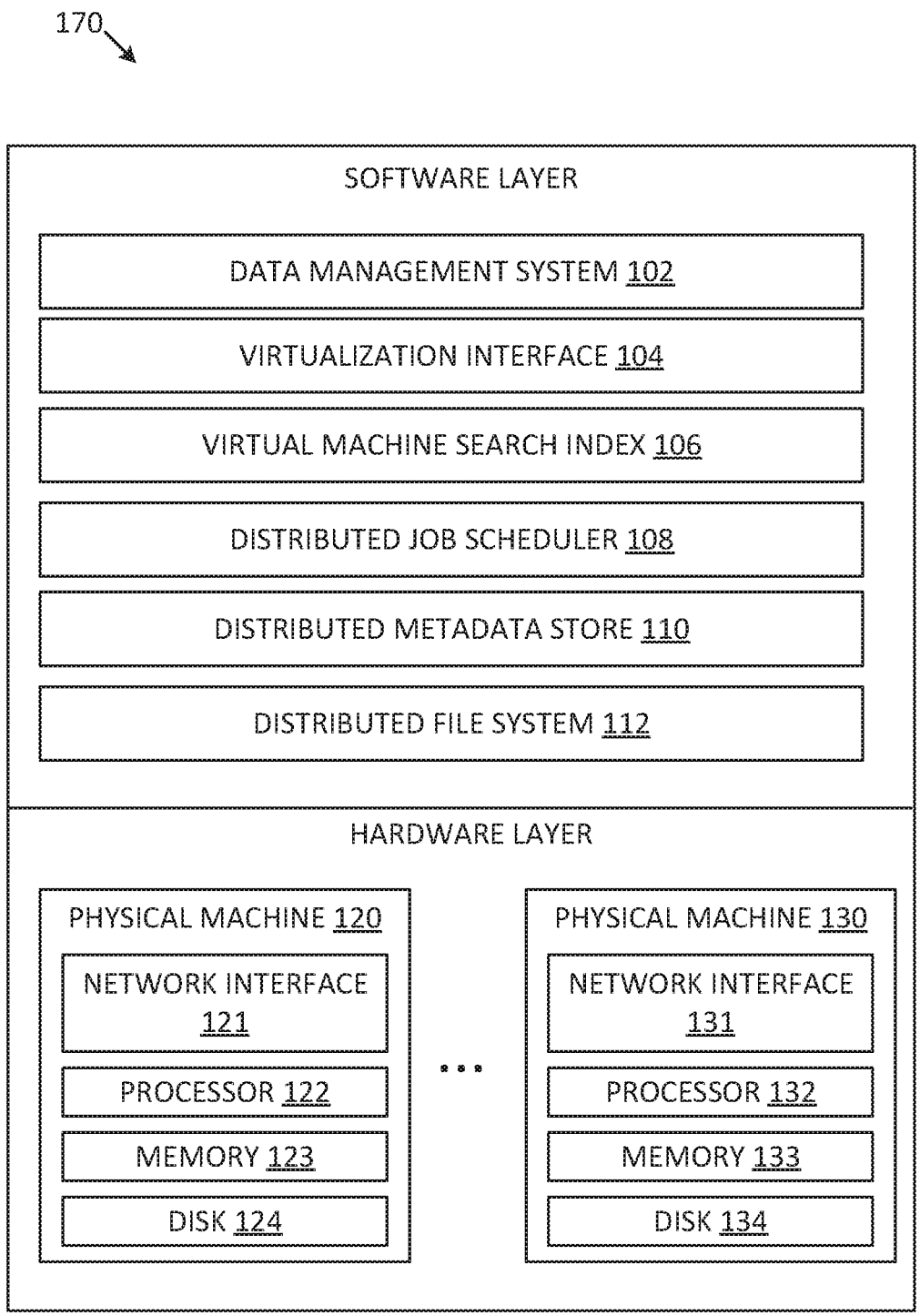
FIG. 1C depicts a storage appliance of a networked computing environment, according to some example embodiments.

FIG. 1C depicts one embodiment of storage appliance 170 in FIG. 1A. The storage appliance 170 may include a plurality of physical machines that may be grouped together and presented as a single computing system. Each physical machine of the plurality of physical machines may comprise a node in a cluster (e.g., a failover cluster, a Cassandra cluster). In one example, the storage appliance 170 may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., four machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B, may be configured with a first floating IP address associated with a first node in the cluster. The hypervisor 186 may connect to the cluster using the first floating IP address. In one example, the hypervisor 186 may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assure the first floating IP address that is used by the hypervisor 186 for communicating with the cluster.

In order to determine which of the other nodes in the cluster will assume the first floating IP address, a VRRP priority may be established. In one example, given a number (N) of nodes in a cluster from node(0) to node(N-1), for a floating IP address (i), the VRRP priority of nodeG may be G-i modulo N. In another example, given a number (N) of nodes in a cluster from node(0) to node(N-1), for a floating IP address (i), the VRRP priority of nodeG may be (i-j) modulo N. In these cases, nodeG will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-50 shots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system 112 for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault-tolerant distributed file system 112. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL, key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snap-shot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault-tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance (e.g., storage appliance 170) that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
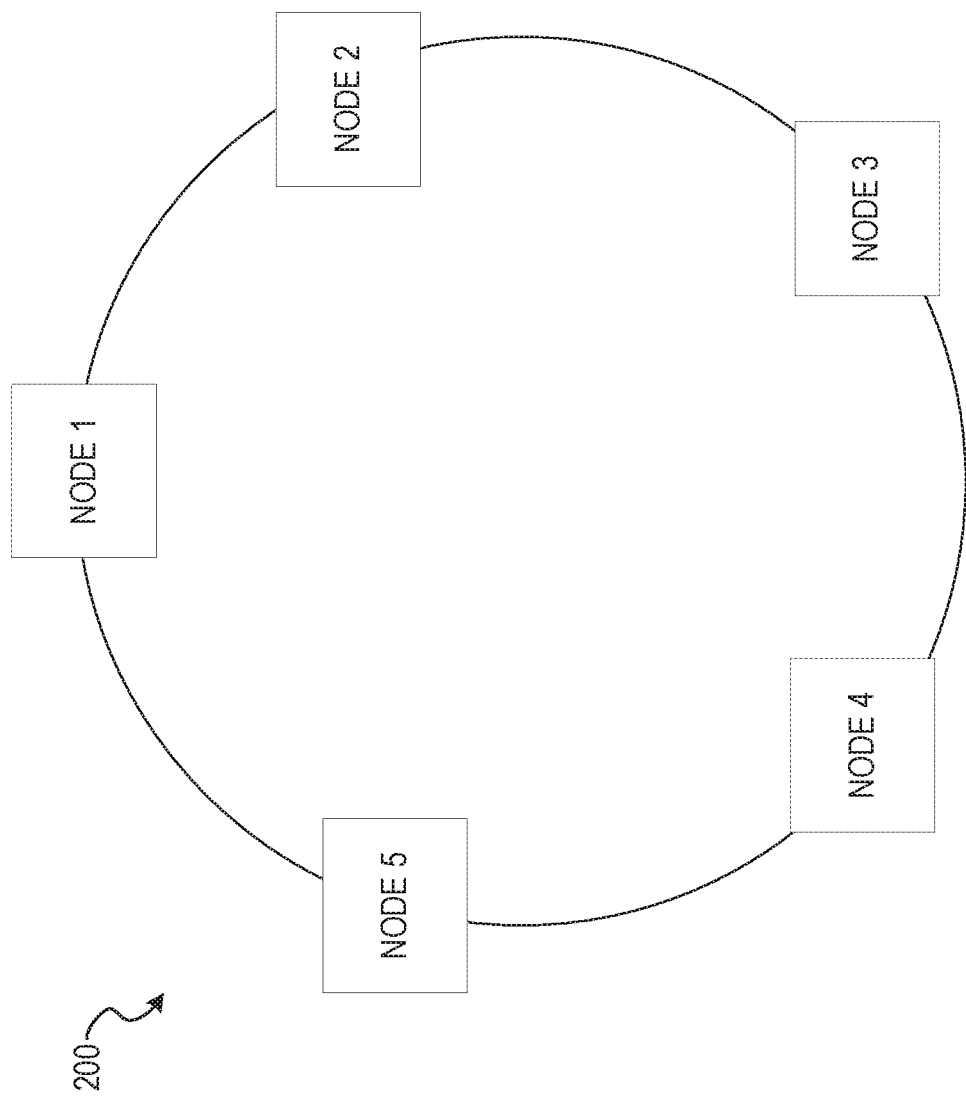
FIG. 2 shows an example cluster of a distributed decentralized database, according to some example embodiments.

FIG. 2 shows an example cluster 200 of a distributed decentralized database, according to some example embodiments. As illustrated, the example cluster 200 includes five nodes, nodes 1-5. In some example embodiments, each of the five nodes runs from different machines, such as physical machine 120 in FIG. 1C or virtual machine 198 in FIG. 1B. The nodes in the cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the cluster 200 in shards or chunks, and decentralized in that there is no central storage device and there no single point of failure. The system operates under an assumption that multiple nodes may go down, up, or become non-responsive, and so-on. Sharding is splitting up of the data horizontally and managing each separately on different nodes. For example, if the data managed by the cluster 200 can be indexed using the 26 letters of the alphabet, node 1 can manage a first shard that handles records that start with A through E, node 2 can manage a second shared that handles records that start with F through J, and so on.

In some example embodiments, data written to one of the nodes is replicated to one or more other nodes per a replication protocol of the cluster 200. For example, data written to node 1 can be replicated to nodes 2 and 3. If node 1 prematurely terminates, node 2 and/or 3 can be used to provide the replicated data. In some example embodiments, each node of cluster 200 frequently exchanges state information about itself and other nodes across the cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the cluster 200.

Reading: Any node of cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of cluster 200 are configured to function the same way (e.g., as symmetrical peer database nodes that communicate via gossip protocol, such as Cassandra nodes) with no single point of failure. If one of the nodes in cluster 200 terminates prematurely ("goes down"), another node can rapidly take the place of the terminated node without disrupting service. The cluster 200 can be a container for a keyspace, which is a container for data in the distributed decentralized database system (e.g., whereas a database is a container for containers in conventional relational databases, the Cassandra keyspace is a container for a. Cassandra database system).

Figure 3:
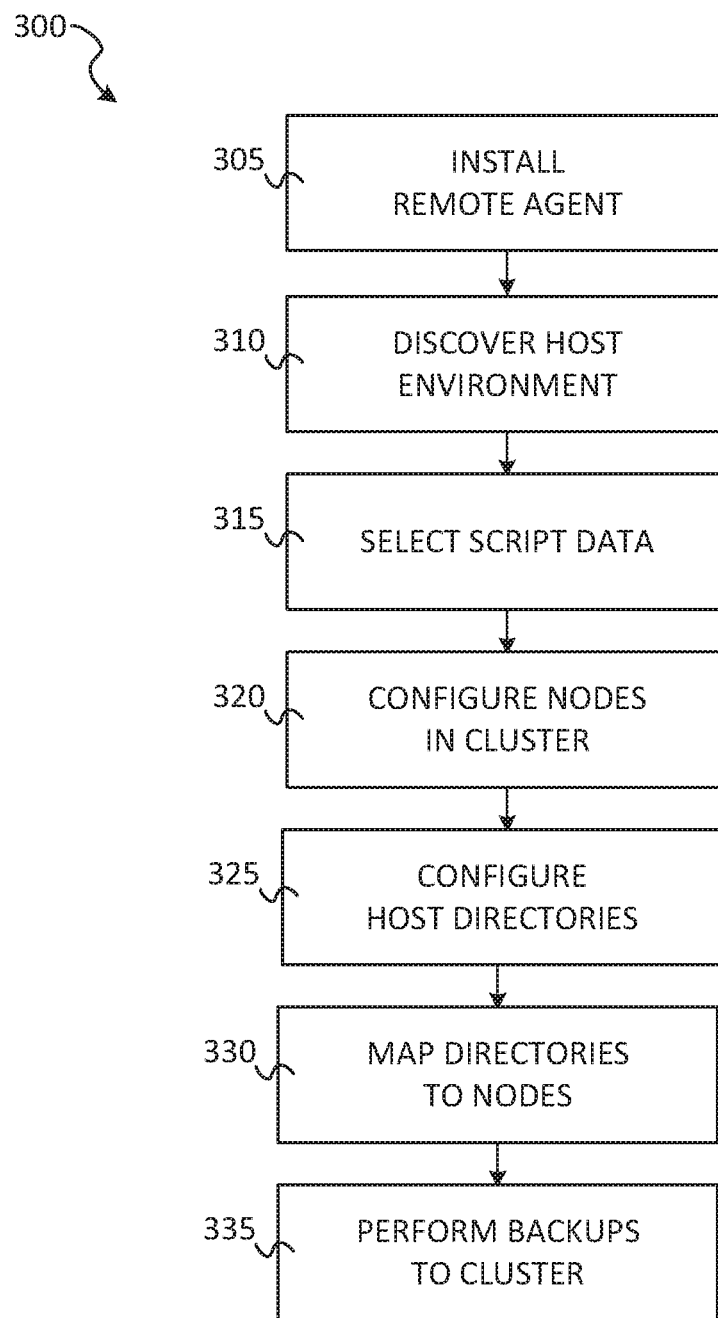
FIG. 3 shows a flow diagram of a method for implementing backup tasks using the cluster, according to some example embodiments.

FIG. 3 shows a flow diagram of a method 300 for implementing backup tasks using the cluster, according to some example embodiments. At operation 305, a remote connector agent is installed on one or more hosts having a database to be backed up or instantly recovered (e.g., from the backup source). At operation 310, the installed remote agent discovers the host environment. For example, at operation 310, the remote connector agent determines whether the database is a standalone host environment or a multi-host database, and further determines whether there are preconfigured database performance tiers (e.g., an SLA) for the database (e.g., where performance data is stored on the host or the cluster). At operation 315, script data selected and stored on the cluster. The script data can include one or more templates which specify scripts (e.g., portions of executable scripting code), the values or parameters to be passed to specified scripts, and the order in which the specified scripts are to be executed on the host to recover the database, as discussed in further detail below.

At operation 320, nodes of the cluster are configured. For example, a first node is configured to manage a first directory, a second node is configured to manage a second directory, a third node is configured to manage a third directory, and a fourth node is configured to manage a script repository. In some example embodiments, the number of nodes generated in the cluster is dependent on the configuration of the database (e.g., standalone, multi-host database) and performance levels. Performance levels can be set for different SLAs for different recovery time objectives (RTOs), where an RTO corresponds to the maximum time under which a failed workload must be recovered. Example, a Basic Tier SLA can ensure 99% uptime per year (3 days, 15 hours, and 36 minutes of downtime per year), a Medium Tier SLA can ensure 99.9% uptime per year (8 hours, 45 minutes, and 36 seconds of downtime per year), and a Highest or Gold Tier SLA can ensure 99.99% uptime per year (52 minutes and 34 seconds of downtime per year). In some example embodiments, if the database has a gold tier SLA with guarantees of fast service and minimal downtime, although the database could be backed and instantly recovered using four nodes, the cluster implements 24 nodes to distribute the files amongst the nodes and create replica nodes to service a request in case another replica node fails.

At operation 325, on the host, the remote agent creates a plurality of directories, where each directory functions as a channel to one of the nodes of the cluster. At operation 330, the directories of the host are mapped to corresponding nodes. For example, at operation 330, a first set of files on the first node in the cluster are live mounted to a first node on the host, the second set of files on the second node in the cluster are live mounted to a second node of the host, and a third set of files on the third node in the cluster is live mounted to a third node of the host. At operation 335, as changes are made to the production database on the host, the changes are propagated to the directories on the host which are live mounts to the cluster. In this way, the changes are automatically propagated to the nodes of the cluster, and no files need be moved in bulk back in forth to keep the files managed on the cluster up to date.

Figure 4:
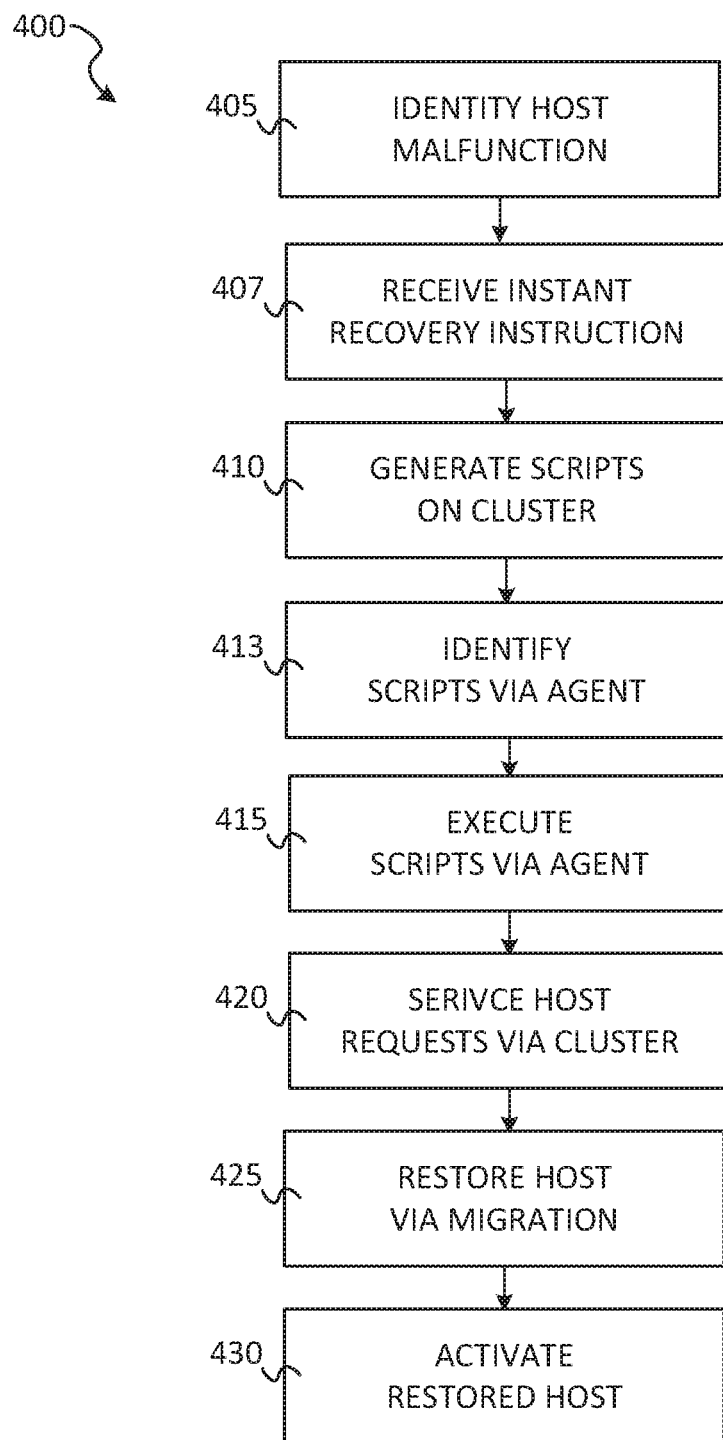
FIG. 4 shows a flow diagram of a method for instantly recovering a database, according to some example embodiments.

FIG. 4 shows a flow diagram of a method 400 for instantly recovering a database, according to some example embodiments. At operation 405, a malfunctioning database is identified. For example, at operation 405, a database administrator views a user interface dashboard listing database statuses to determine that one of the database hosts is malfunctioning or is otherwise down (e.g., the dashboard displays an error message for a given database).

At operation 407, an instant recovery instruction is received. For example, at operation 407, the database administrator viewing the dashboard selects button on the dashboard to initiate instant recovery of the malfunctioning database.

At operation 410, one or more script templates are executed to generate scripts. For example, on the cluster, a template engine (e.g., template engine 637, discussed below with reference to FIGS. 6A-6D) executes a template to generate a shell script and populate the shell script with values (e.g., settings, database paths), and the resulted generated and populated script is stored on the script node of the cluster for execution on the host via the live mounted remote connector agent. In some example embodiments, the template engine can be configured as a Jinja application environment that processes Jinja files that create layout files, such bash file script comprising RMAN commands (Recovery Manager, "RMAN" by Oracle) and SQL commands to perform tasks. As an example, a Jinja template sample file (file name: "script1.j2") can include:

```
:::::::: CODE PORTION 1 ::::::::
#!/bin/bash
export ORACLE_HOME={{ oracle_home }}
export ORACLE_SID={{ oracle_sid }}{{ inst_num }}
# Startup the Oracle instance
$ORACLE_HOME/bin/sqlplus / as sysdba <<EOF
spool {{ log_path }}/{{ log_id }}.log append;
shutdown immediate;
startup {{ mode }} pfile='{{ pfile_name }}';
spool off;
EOF
::::::::::::::::::::::::::::::::::
```

In the above example, the code parts within {{...}} (e.g., {{oracle_home }}, {{oracle_sid }}, etc. are placeholders that are replaced with configuration parameters (e.g., database type, mode, operational parameters) and data values (e.g., names, paths) based on the database job that is running (e.g., instant recovery job, live mount clone job). The data values used to replace the placeholders are stored in control or settings files on the database host, or within the cluster. The data values used to replace the placeholder values can include parameters, paths, filenames used to get the database to be recovered functional.

For example, after execution by the template engine (e.g., Jinja environment), the values are replaced and a bash script file results which is stored on the script node. An example output of script (file name: "sample_script") can include:

```
:::::::: CODE PORTION 2 ::::::::
#!/bin/bash
export ORACLE_HOME=/home/linux/oracle/
export ORACLE_SID=testdb1
# Startup the Oracle instance
$ORACLE_HOME/bin/rman / as sysdba <<EOF
spool /var/log/comp/sample_script.log append;
shutdown immediate;
startup NOMOUNT pfile='/tmp/sample_pfile.ora';
spool off;
EOF
::::::::::::::::::::::::::::::::::
```

In some example embodiments, when the placeholder values are populated can vary. In some example embodiments, the placeholder values for a given template (e.g., instant recovery template) are populated when the instant recovery job is initiated, so that the populated values are the most up-to-date parameters, paths, and data files.

As an additional example, a portion of a backup template used to implement method 300 (FIG. 3, above) can include:

```
:::::::: CODE PORTION 3 ::::::::
backup controlfile to {{ path }};
{% for index in channel_indices %}
allocate channel c{{ index }};
{% endfor %}
backup incremental level 1
::::::::::::::::::::::::::::::::::
```

As used here, a backup job to the cluster includes steps needed to backup a database to the cluster. Compared to, for example, an instant recovery job, which includes commands needed to recover a copy of a backup to a target host (e.g., a downed standalone production server, a target host for live mount cloning). The parameters can populate the placeholders for a given backup job template (e.g., frequency of backups, such as daily or hourly). Upon a backup being initiated the backup tasks are performed to backup files from the directories to the cluster using the backup scripts generated from the backup template.

Continuing, at operation 413, the remote connector agent running on the host identifies the generated scripts stored on the live mounted script node. At operation 415, the remote connector agent executes the identified scripts on the host environment to instantly recover the database on the host, as discussed further with reference to FIG. 5.

Figure 5:
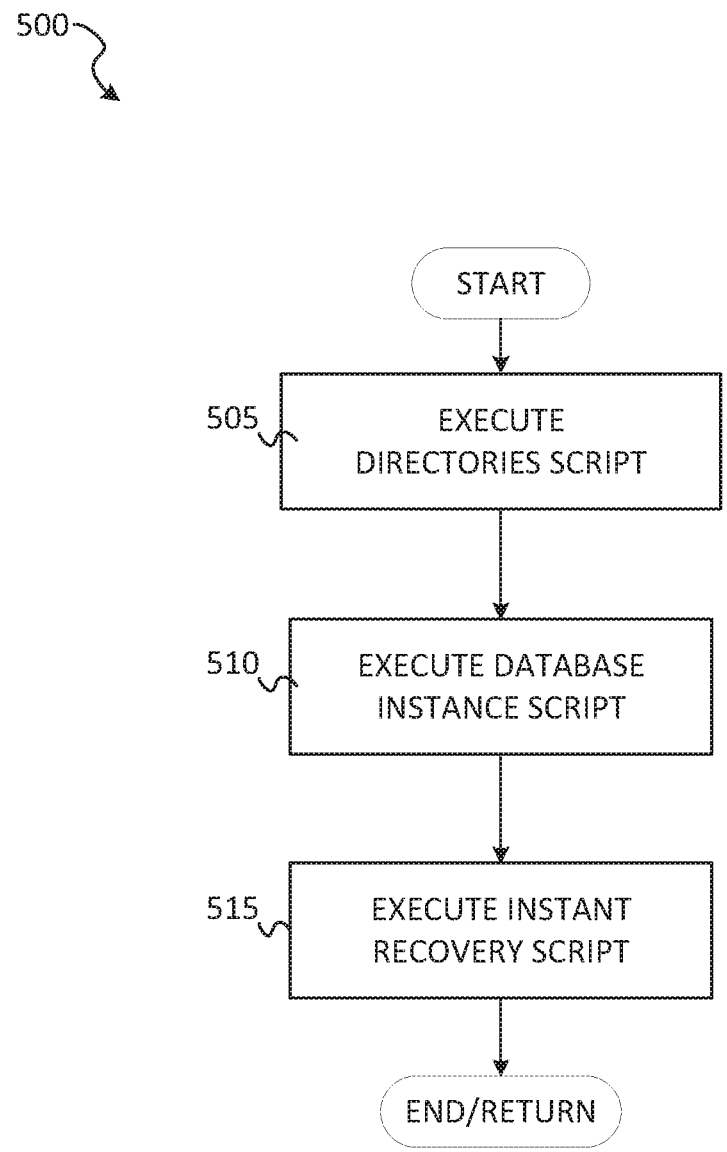
FIG. 5 shows an example method for executing scripts on the host, according to some example embodiments.

FIG. 5 shows an example method 500 for executing scripts on the host, according to some example embodiments. Each of the operations corresponds to a script generated by a template (e.g., Jinja file), with placeholder values replaced based on the database values of the host environment. That is, for example, a template file generates a first script for operation 505, a second script for operation 510, and a third script for operation 515, which are executed in sequence, according to some example embodiments. In some example embodiments, the scripts are code portions that perform a certain task. For example, a template can include:

a first script section comprising 20 lines of code (with placeholders) for generating a create directory, a second script section after the first script section, where the second script section comprises 20 additional lines of code (with placeholders) for generating a database instance, and a third script section after the second script section, where the third script section comprises 20 additional lines of code (with placeholders) for performing instant recovery operations.

When the template is executed, the resulting output data is a bash file having the script code sections in the same order but with populated values. The individual bash file can then be executed on the host (via agent 142) from top to bottom to implement the scripts in the order of the template, according to some example embodiments.

In other example embodiments, the scripts are files external to the template file, which are imported in the sequence listed in the template (e.g., import "script1.txt"; import "script2.txt", and so on). Further, in some example embodiments, the resulting scripts generated for different tasks are stored as separate files on the script node, then transmitted to the agent on the host for remote execution in a default order. For example, a first script may have a file name that starts with "1", the second script may have a file name that starts with "2" and so on, and the remote agent is configured to execute scripts by file name, from least to greatest, such that the script with the file name that starts with "1" is executed before the script that starts with "2", and so on. Accordingly, is appreciated that the operations of method 500 can be implemented in one continuous operation (e.g., as one executable script with different script portions), or in stages (e.g., where the scripts are separately executable files).

With reference to the method 500, at operation 505, the remote connector agent first executes a first script that creates a plurality of directories on the host. At operation 510, the remote connector agent executes a second script that generates a bare-bones database instance on the host (e.g., an Oracle relational database instance). At operation 515, the remote connector agent executes a third script that performs instant recovery actions, such as restoring database tables and applying redo logs to the database tables, followed by opening the database as a production database in read/write mode.

Returning to FIG. 4, at operation 420, the hosts utilizes the instantly recovered database (e.g., the live mounted directories on the cluster) to service database requests received by the host. For example, the production database may be a database for an auto-parts website, where changes to the production database are propagated to the directories that are live mounts to the cluster. In a disaster scenario, the production database goes down or otherwise malfunctions, and the remote connector agent instantly recovers the database on the cluster via execution of the scripts (e.g., directory creation, application of redo logs, etc.). Because the files are materialized on the cluster and live mounted as database directories on the host, the database is quickly brought online to provide support for the website without having to migrate large files. For example, at operation 420, the website receives a query for auto parts from end-users browsing the site, and the cluster of nodes generates query results via one of the nodes that manages some or all of the queried data. While providing query response data over the live mounted nodes may not be as fast as queries to a production database with locally stored data, the files are still available, and the database is more quickly brought online, instead of waiting for live migration of files from a backup location to the production server.

At operation 425, a migration engine (e.g., migration engine 613, FIG. 6D below) begins file migration from a backup file store to the host. For example, after the production server goes down and database services are processed via the live mounted cluster database, the production server can receive actual backup datafiles for local storage via file migration as a background process. In this way, while the cluster manages database requests via live mounts and directory channels (e.g., RMAN channels), the production server is restored slowly in the background without degrading service requirements (e.g., SLA). At operation 430, after migration is complete, the migration engine activates the restore host database and the cluster live mounted database returns to a backup standby state.

Figure 6A:
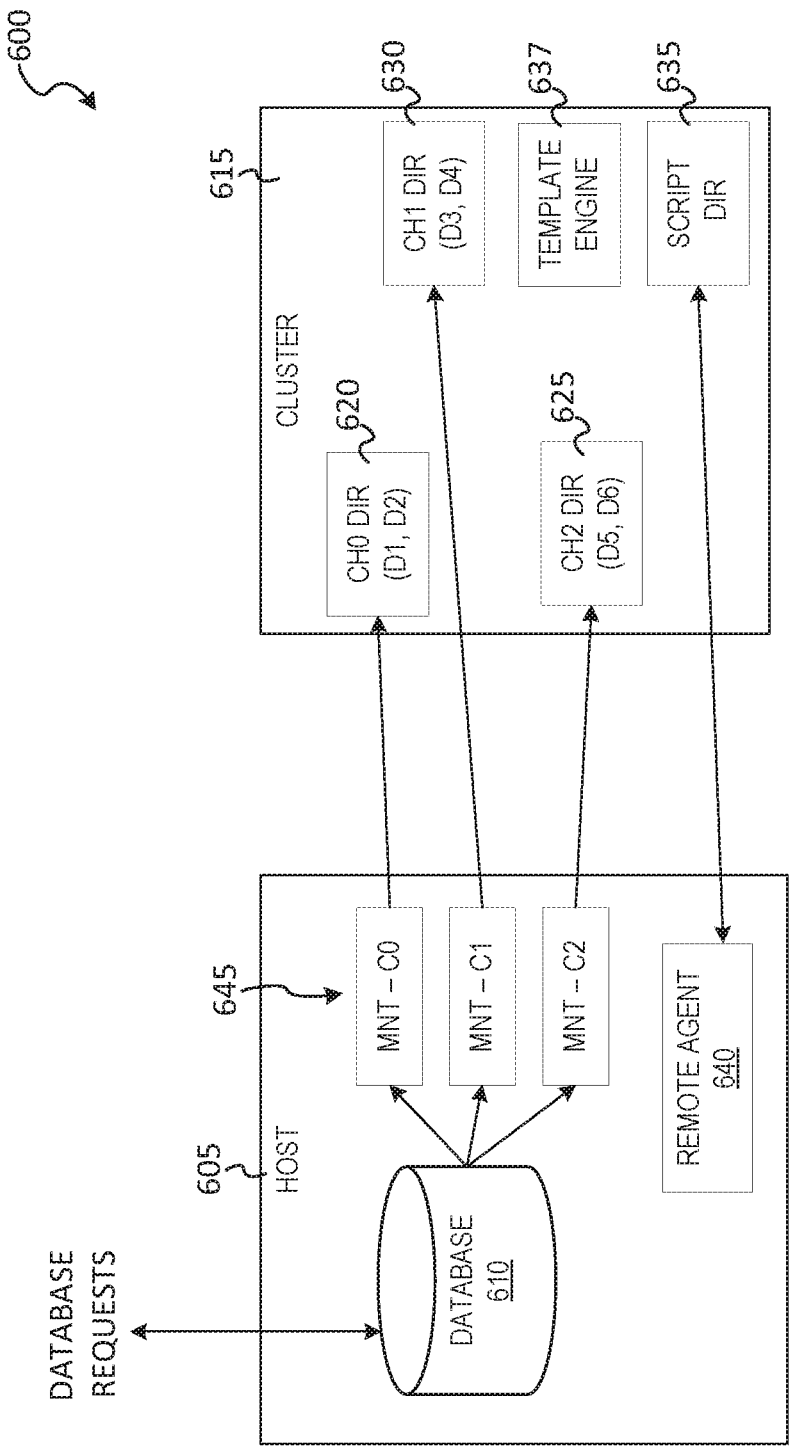
FIGS. 6A-6D show example data structures for performing recovery, according to some example embodiments.

FIGS. 6A-6D show an example database network architecture 600 for performing instant recovery, according to some example embodiments. With reference to FIG. 6A, the database host 605 includes a production database 610 (e.g., an Oracle relational database) that services database requests (e.g., reads, writes, etc.). As discussed above, the cluster 615 is remotely connected over a network to the host 605 and is configured to provide instant recovery services for the database host 605. For example, the host 605 can correspond to storage appliance 140 and the cluster 615 can be implemented as cluster 200 within datacenter 150 (e.g., the cluster 200 may be managed by storage appliance 170). In those example embodiments, the host 605 may further comprise additional applications, such as database management applications that interface with the remote agent 640 (e.g., the remote agent 640 may plug in or integrate as an extension of the database management applications that manage database 610).

As illustrated, the cluster 615 includes a plurality of file nodes including node 620, node 625, and node 630 which manage one or more files for directories on the database 610. The cluster of nodes further includes a script node 635, which functions as the script directory for storage for scripts, and a template engine 637 which generates scripts with values populated in the scripts that are custom to the database network architecture. The templates in the template engine 637 may include a first template for a first type of database job (e.g., instant recovery), a second template for a second type of database job (e.g., live mount cloning), a third template for a third type of database job (e.g., setup of periodic full backups to the cluster), and so on. Each template is a pre-configured file with placeholder values. In this way, the templates can rapidly be utilized in different database environments even though the actual values populate in the scripts specified by the template may change or only be known at a later time (e.g., when the database host malfunctions) Although, the template engine is shown on the cluster 615 external to the script node 635, in some example embodiments the template engine 637 is integrated and runs on top of the script node 635, and in other embodiments, the template engine 637 may be hosted on a device external to the cluster 615, such as a remotely connected virtual machine. In one example embodiments, the template engine 637 is a python execution environment running Jinja, which generates layout language and passes values to the generated layout language. In some example embodiments, the files generated by the templates are bash files with different command types (e.g., SQL commands of a SQL database application, RMAN commands, etc.), and the bash files are natively executable as scripts on the host 605.

Further illustrated in FIG. 6A, is a plurality of directories 645, each of which is live mounted to one of the clusters via NFS mounting. As changes occur to the database 610, the changes are propagated to the directories 645, which, due to being live mounted, automatically propagates the changes to the cluster 615 over the live mount channel (e.g., RMAN channel), which may be remotely located in case the database host 605 undergoes a disaster and needs to be instantly recovered. The remote agent 640 is installed on the host 605 and has access/permissions to create directories, install database instances, and execute scripts (e.g., RMAN scripts) on the host 605. The remote connector is NFS mounted to the script node 635 to access scripts stored on the script node 635 and run the scripts on the host 605 to perform instant recovery of the database 610.

Figure 6B:
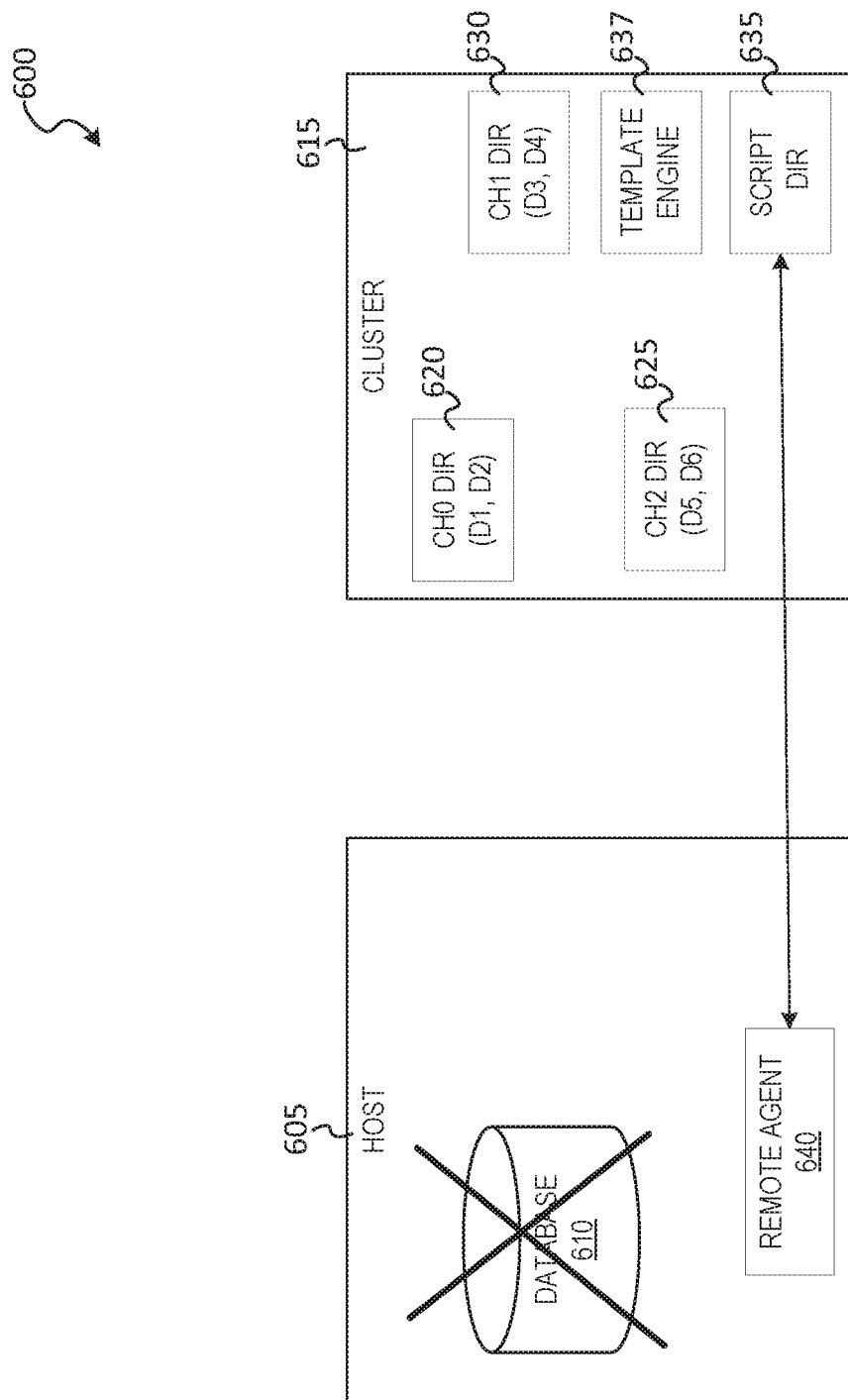
Figure 6C:
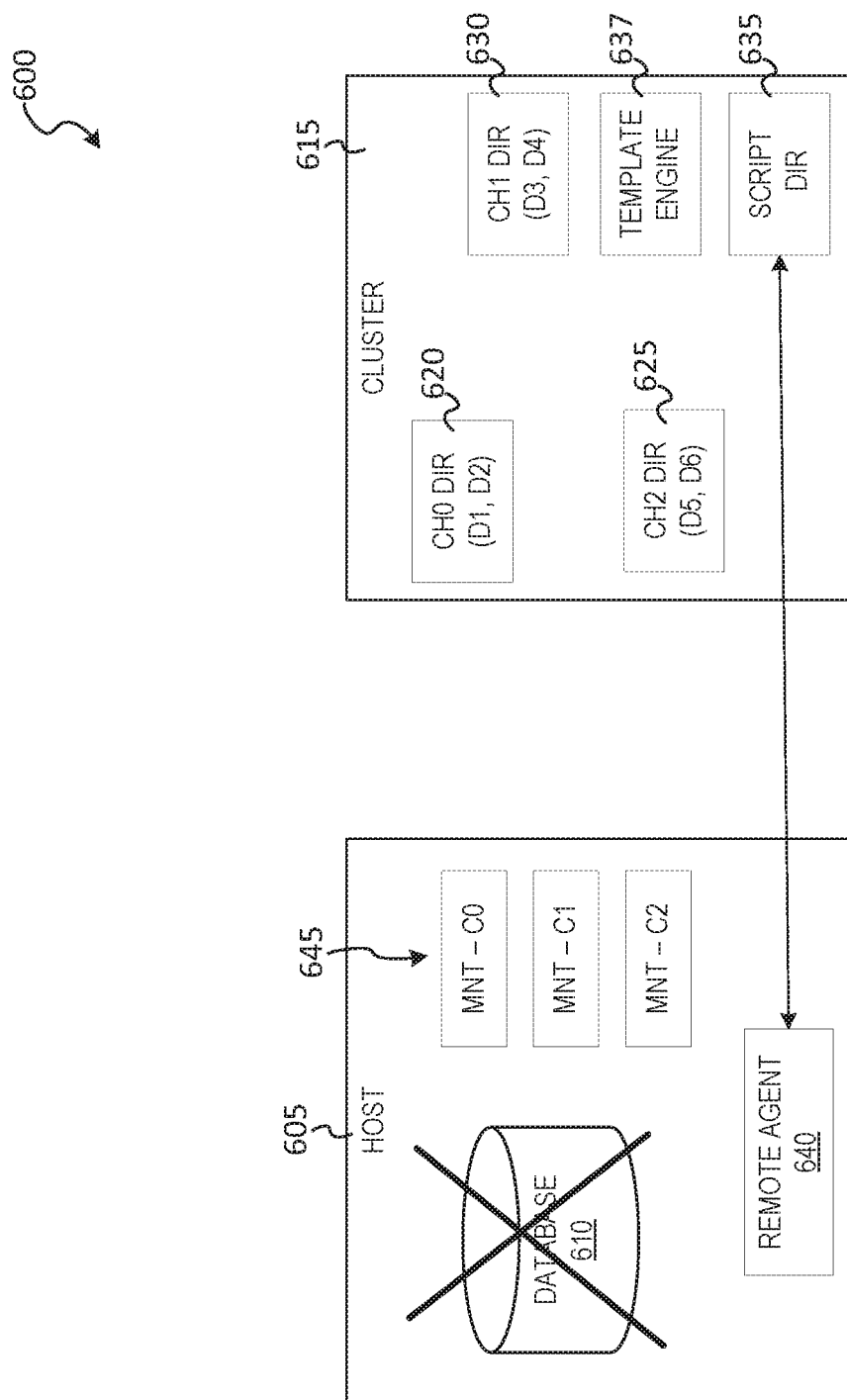

For example, as illustrated in FIG. 6B, the database 610 has malfunctioned as denoted by the "X" over the database 610. For example, the database 610 may become corrupt, or the physical hardware of the host 605 may become damaged. In response the database 610 going down, the remote agent 640 is activated and live mounts the script node 635. In some example embodiments, the remote agent 640 is damaged or removed when the database 610 malfunctions. In those example embodiments, the remote agent 640 is first reinstalled on the database host 605. The remote agent 640 then executes the scripts on the host 605 to recover the database data as a live mounted cluster supported database. For example, with reference to FIG. 6C, the remote agent 640 first executes the first script to create the plurality of directories 645 on the host 605.

Figure 6D:
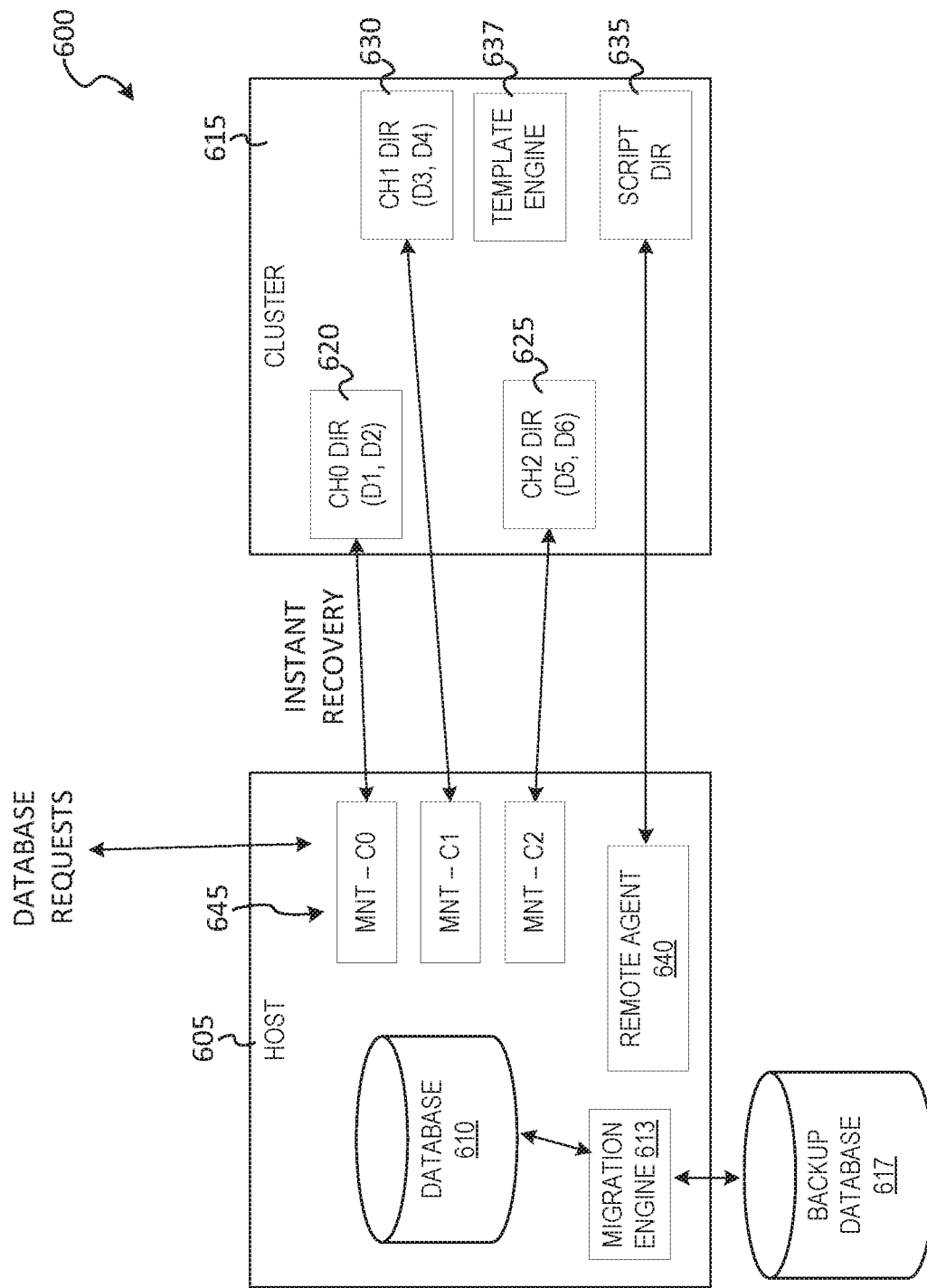

Turning to FIG. 6D, the remote agent 640 then executes one or more additional scripts (e.g., script portions, or sections of a single bash file) to install a bare-bones database instance upon which a plurality of directories 645 can be live mounted to nodes of the cluster 615. Further, the remote agent 640 executes additional scripts to perform additional actions, such as applying redo logs to bring the directories 645 up to the latest recovery state. After execution of the scripts, the database data on the host 605 has been instantly recovered as the plurality of directories 645 are operating on the newly created database instance and can service database requests. For example, a database query may be received by the host 605 and can instantly be serviced via a channel to the node 620 for one or more data files, such as D1. Notably, the actual files need not be migrated to the host 605. For example, the database files D1 and D2 (e.g., tables) may remain on the cluster 615, while only portions that correspond to query results from D1 and D2 are sent back to the 605 via the live mounted channel (e.g., RMAN channel).

Further, as the database requests are serviced by the live mounted cluster 615, the database 610 can be restored via migration of backup data files (e.g., D1-D6) file migration from a backup database 617. For example, the backup database 617 locally stores a copy of the database 610 (including the files D1, D2, D3, D4, D5, and D6), and while the cluster 615 services the database requests via live mounting as discussed above, the migration engine 613 moves D1-D6 files and any control/setting files, redo logs, etc.) from the backup database 617 to the database 610 for local storage on the host 605. In this way, end-users (e.g., website users) and database administrators will have instant access to the database files via the cluster 615 while in the background the database 610 is recovered using the slower file migration process. Further, although not illustrated in FIGS. 6A-6C, the host 605 can include additional modules or applications to perform database management. For example, the host 605 can include database management software (e.g., application 144) that receives the requests and utilizes the database 610 if that database is operational or utilizes directories 645 if instant recovery has been. initialized.

Figure 7:
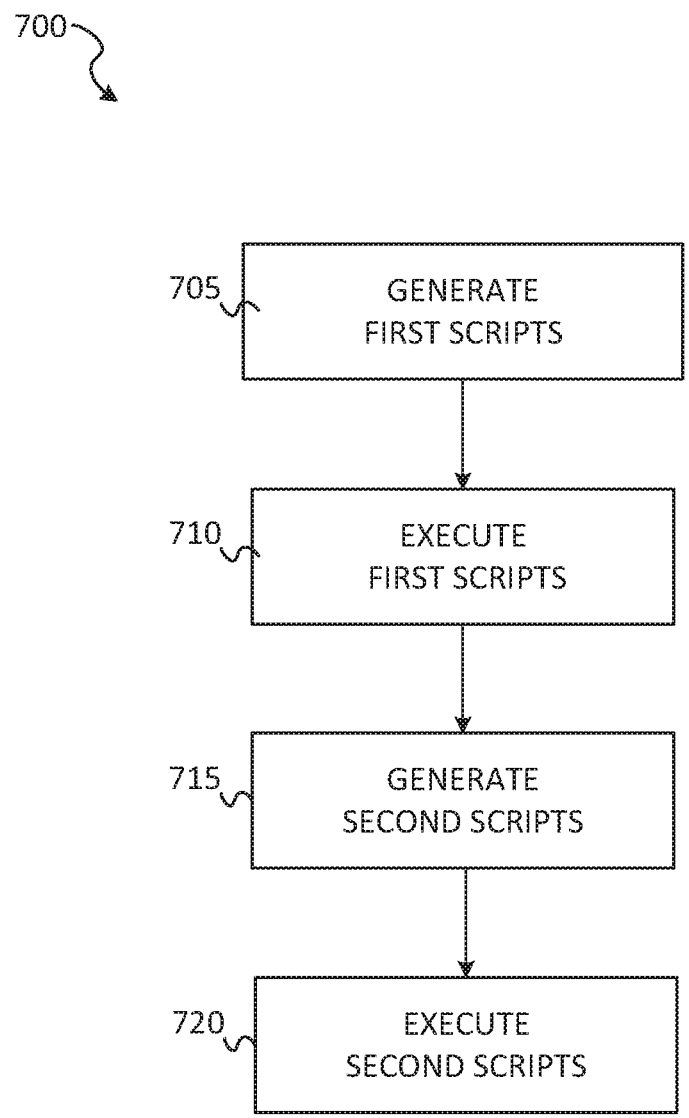
FIG. 7 shows an example flow diagram of an example method for processing scripts using a template, according to some example embodiments.

FIG. 7 shows an example flow diagram of an example method 700 generating sets of scripts using sequenced templates, according to some example embodiments. As discussed above, a template can generate one or more scripts (e.g., script files, script portions within a template file) and populate placeholder values in the scripts with values retrieved from the host to be instantly recovered and/or the cluster that provides the backup functionality. In some example embodiments, a database job uses a sequence of templates, where later template files are only executed after earlier template files (and/or scripts generated therefrom) complete execution. For example, a first template may specify three scripts and perform a number of actions on a database, and a second template may use, as input data, data created by the actions caused by the first script. For example, a first template may instantly recover a single database instance, and a second template may instantly recover other instances of the database, where the file paths, and values to be used to create the other instances of the other database need to "know" or rely upon how or where the first database is created.

Figure 8:
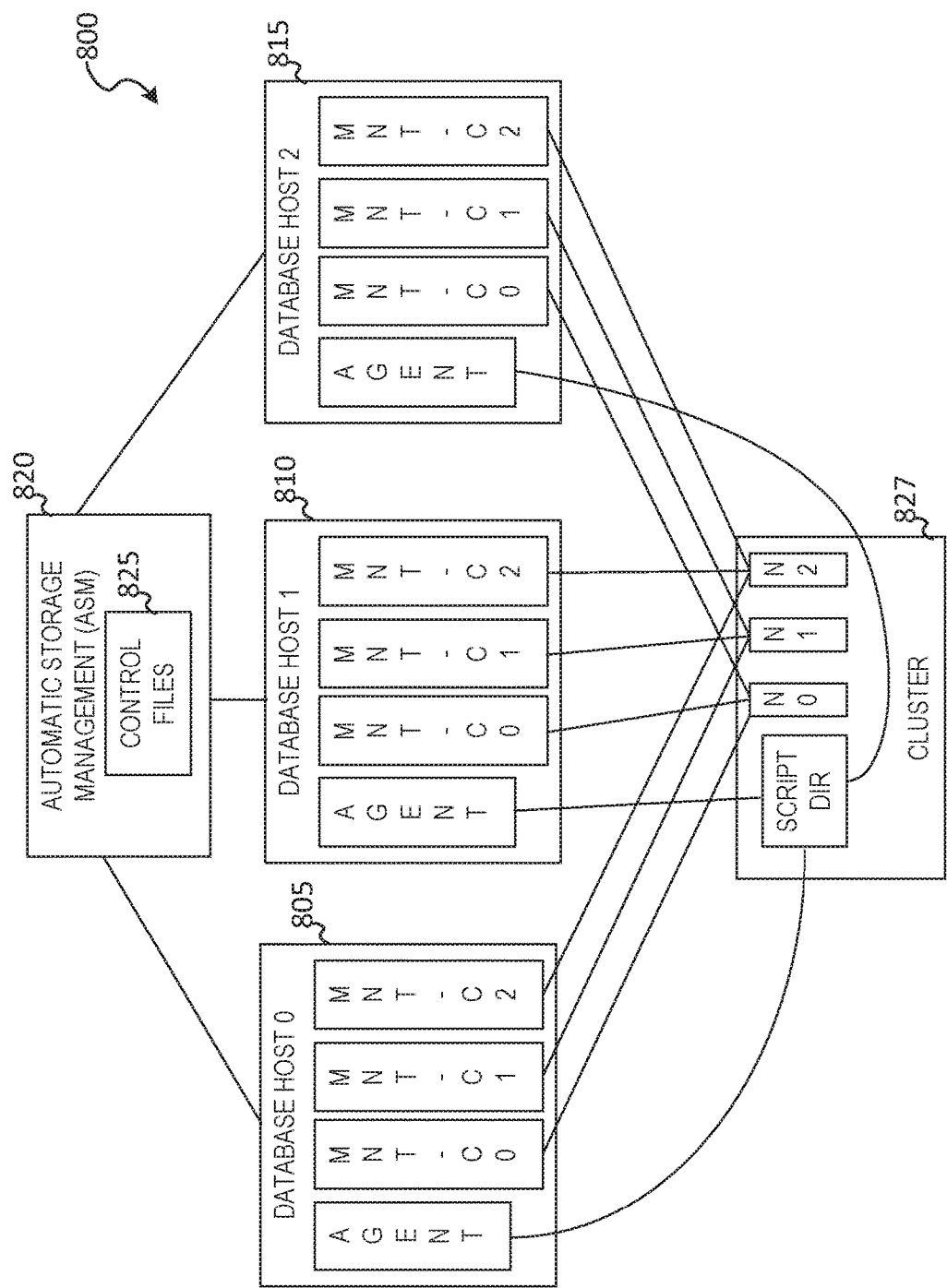
FIG. 8 shows an example multi-host database for performing instant recovery, according to some example embodiments.

FIGS. 7 and 8 show an example a multi-host database being instantly recovered via the cluster, as an example. Jumping to FIG. 8, a multi-host database environment 800 for performing instant recovery using a cluster is illustrated, according to some example embodiments. The multi-host database environment 800 includes three database hosts 805, 810, and 815 (e.g., three physical servers, three virtual server instances), which store copies of the same directories (e.g., MNT_C0, MNT_C1, MNT_C2) and a remote agent ("agent") installed on each host. Further, the multi-host database environment 800 includes an automatic storage management system 820 which stores the shared pool of files shared by the database hosts 805, 810, 815 and control and settings information. Although each database host is configured to use the ASM 820 as the shared pool, each instance has been live mounted to the cluster 827 as illustrated by the lines connecting each directory to nodes ("N0", "N1", "N3") on the cluster. That is, for example, each of the hosts "MNT_C0" is NFS mounted over a channel to the first node "N0", and so on. To instantly recover the multi-host database environment 800, two templates are implemented: a first template to instantly recover one of the hosts 805, 810, and 815, which is then deemed the primary host, and a second template that instantly recovers the remaining hosts based on which host is acting as the primary host. In some example embodiments, when a remote agent is installed on any of the hosts 805, the remote agent discovers the configuration of the multi-host database environment 800, such as host quantity (e.g., standalone or as shown in FIG. 8: three hosts 805, 810, and 815), locations of other hosts, location or address of control files 825, and any other values need to live mount the databases to the cluster 827.

Returning to FIG. 7, assume that the multi-host database environment 800 undergoes a disaster scenario and all the database hosts 805, 810, 815 malfunction. In this example, at operation 705, the template engine on the backup cluster 827 (not depicted in FIG. 8) generates the first set of scripts (e.g., script portions, script files) using a first template. The first template can be an instant recovery template, as discussed above, that generates scripts to bring one of the hosts back up, and whichever host is selected is deemed the primary host.

At operation 710, a remote agent on a database host executes the first scripts to perform one or more database actions. For example, the first template generates scripts which the agent on host 805 executes to instantly recover the database of host 805, which then acts as a primary host.

At operation 715, the script node on the backup cluster generates a second set of scripts using the output of the first set of scripts. For example, after the host 805 is instantly recovered and is the primary host, the second template can use the file paths and values to bring up database hosts 810 and 815, where the values populated in the scripts of the second template include existing paths and values of the primary host, host 805. At operation 720, the remote agent on one or more hosts executes the second set of scripts generated by the second template. For example, the agent on host 810 executes the second set of scripts to instantly recover a replica of the database files.

Figure 9:
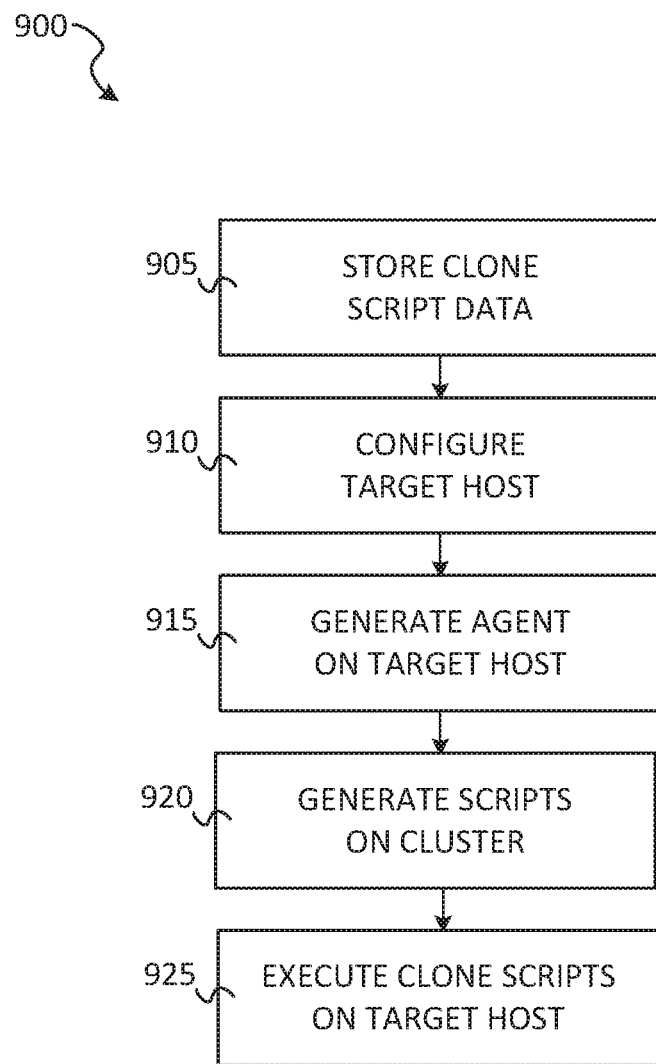
FIG. 9 shows a flow diagram of a method for performing cloning using a cluster, according to some example embodiments.

FIG. 9 shows a flow diagram of a method 900 for performing; cloning using a cluster, according to some example embodiments. In the example of FIG. 9, the template and script node scripts are configured to use the cluster as source data to clone the source database to a new host (e.g., target host), which can be used for various purposes (e.g., application testing, etc.). At operation 905, script clone data (e.g., cloning template) is stored on the script node of the cluster. At operation 910, the target host is configured. For example, the database administrator specifies that a source database should be cloned to a target database, via live mounting to nodes of a cluster. At operation 915, a remote agent is generated (e.g., installed) on the target host. At operation 920, the one or more stored cloning templates are executed to generate the executable scripts and populate the scripts with values. At operation 925, the agent operating on the target host accesses the generated scripts on the script node via live mounting and executes the generated scripts on the target host to clone the database of the source host to the target host.

Figure 10A:
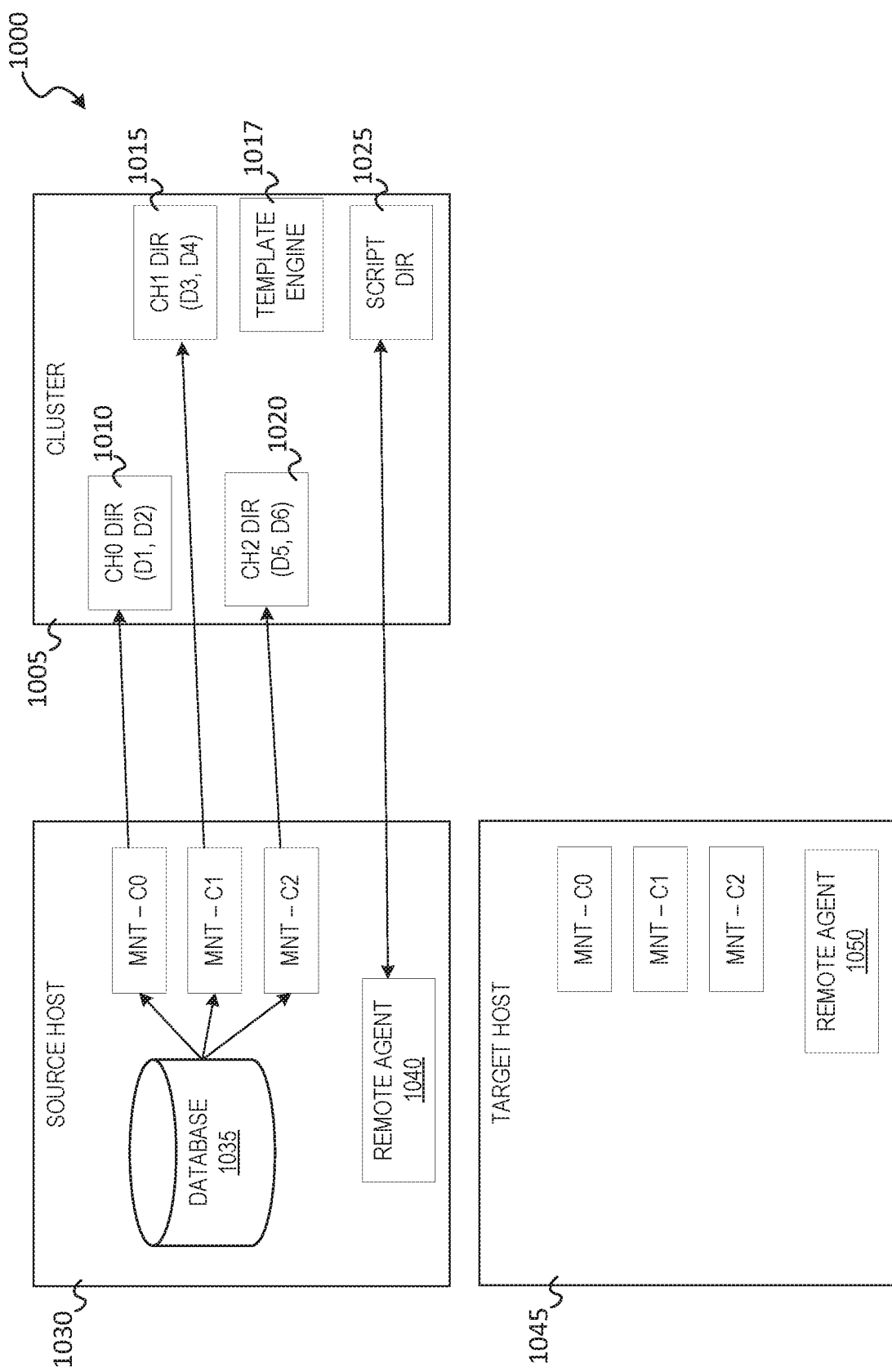
FIGS. 10A and 10B show example data structures for performing cloning using a cluster, according to some example embodiments.
Figure 10B:
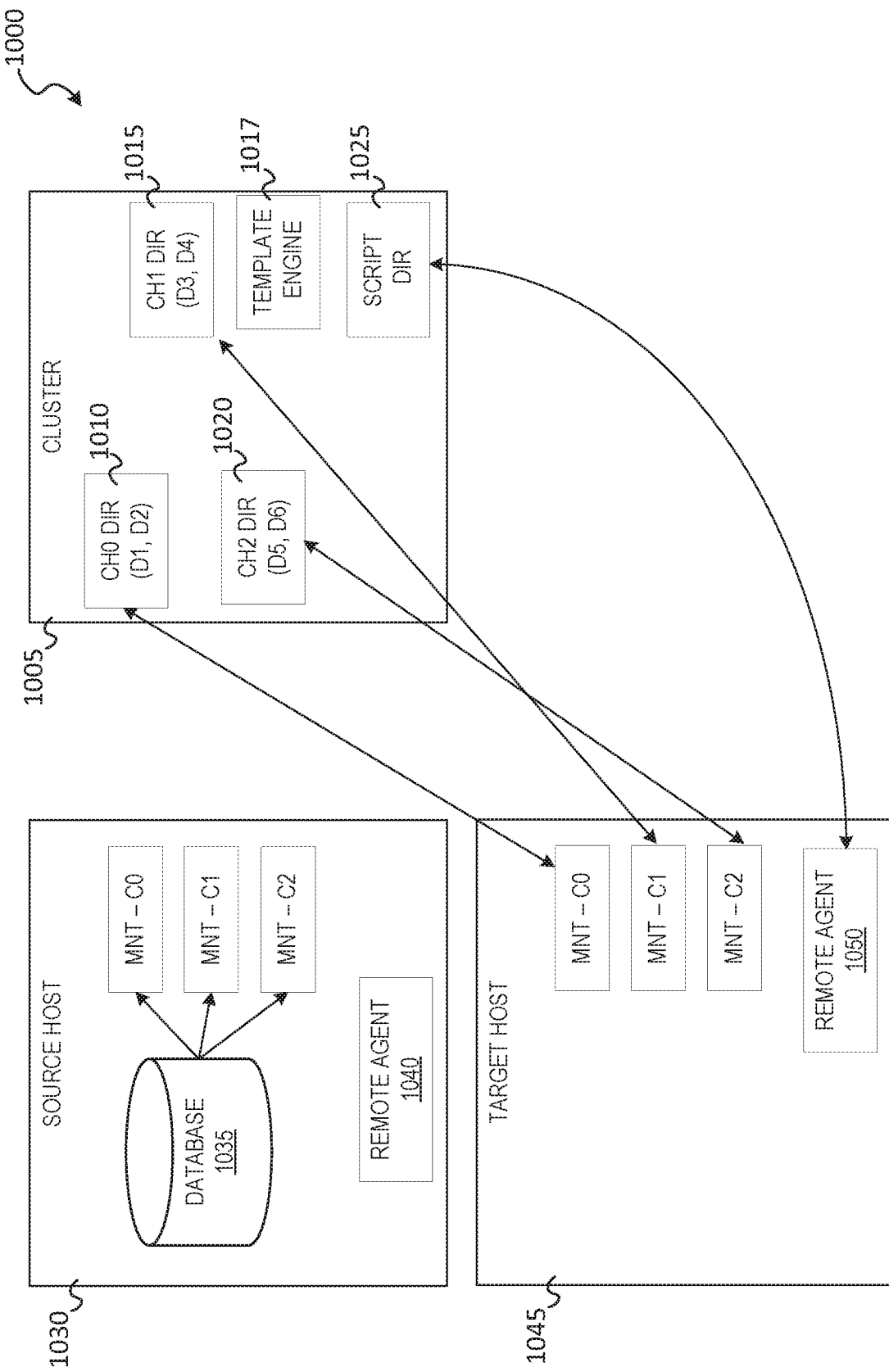
Figure 11:
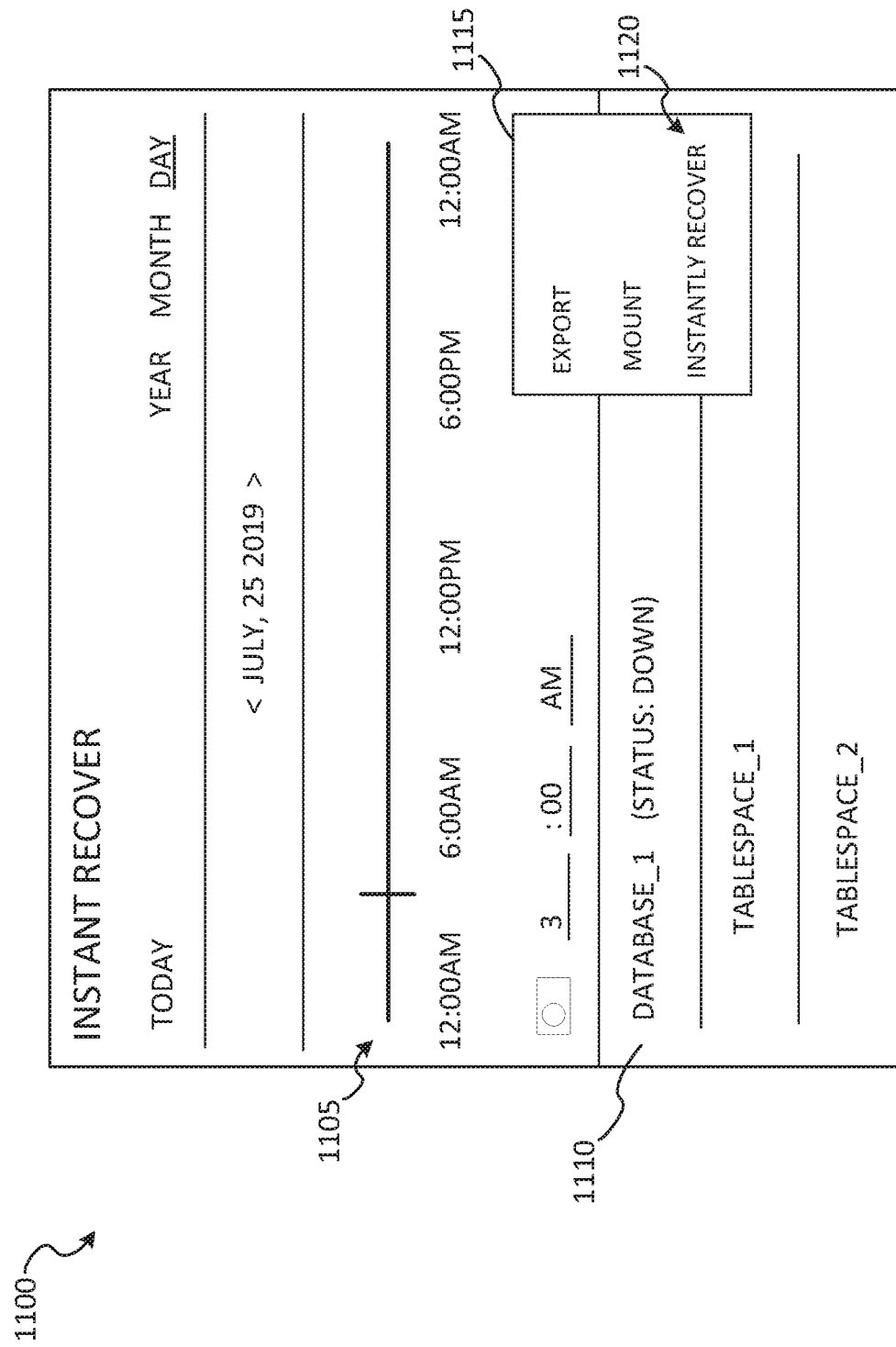
FIG. 11 shows an example user interface for performing recovery using a cluster, according to some example embodiments.

FIGS. 10A and 10B show example network architecture 1000 for performing instant clone using a cluster, according to some example embodiments. With reference to FIG. 10A, the cluster 1005 includes a plurality of nodes 1010, 1015, 1020 which are mapped to directories of the source host 1030. Further, the remote agent 1040 operates on the source host 1030 to identify the configuration of the host and selects script data (e.g., templates) on the cluster 1005 for execution by the template engine 1017. Further illustrated in FIG. 10A is a target host 1045 (e.g., target host selected by a database administrator), on which a clone of the database 1035 can be instantiated via the cluster 1005. In some example embodiments, the target host is an external host accessed over a network, such as storage appliance 140, while in some other embodiments, the target host may be created and managed locally (e.g., within datacenter 150).

As illustrated in FIG. 10B, a remote agent 1050 on the target host 1045 is activated to live mount the scripts on the script node 1025. The remote agent 1040 then executes the scripts in the script directory on the target host 1045 to generate directories on the target host 1045 (e.g., "MNT_C0", "MNT_C1", "MNT_C2") which are then mapped to the nodes operating on the cluster 1005. After cloning, test applications can safely interact with the target host 1045, and after the test applications are debugged (e.g., error data stored for analysis), and fixes are created for the bugs, the test applications can be safely integrated to interface with the database 1035 on source host 1030 (e.g., the production server). In some example embodiments, the source and target host are the same device, where the host contains one source database and one or more clones that are lives mounts to the cluster.

Figure 12:
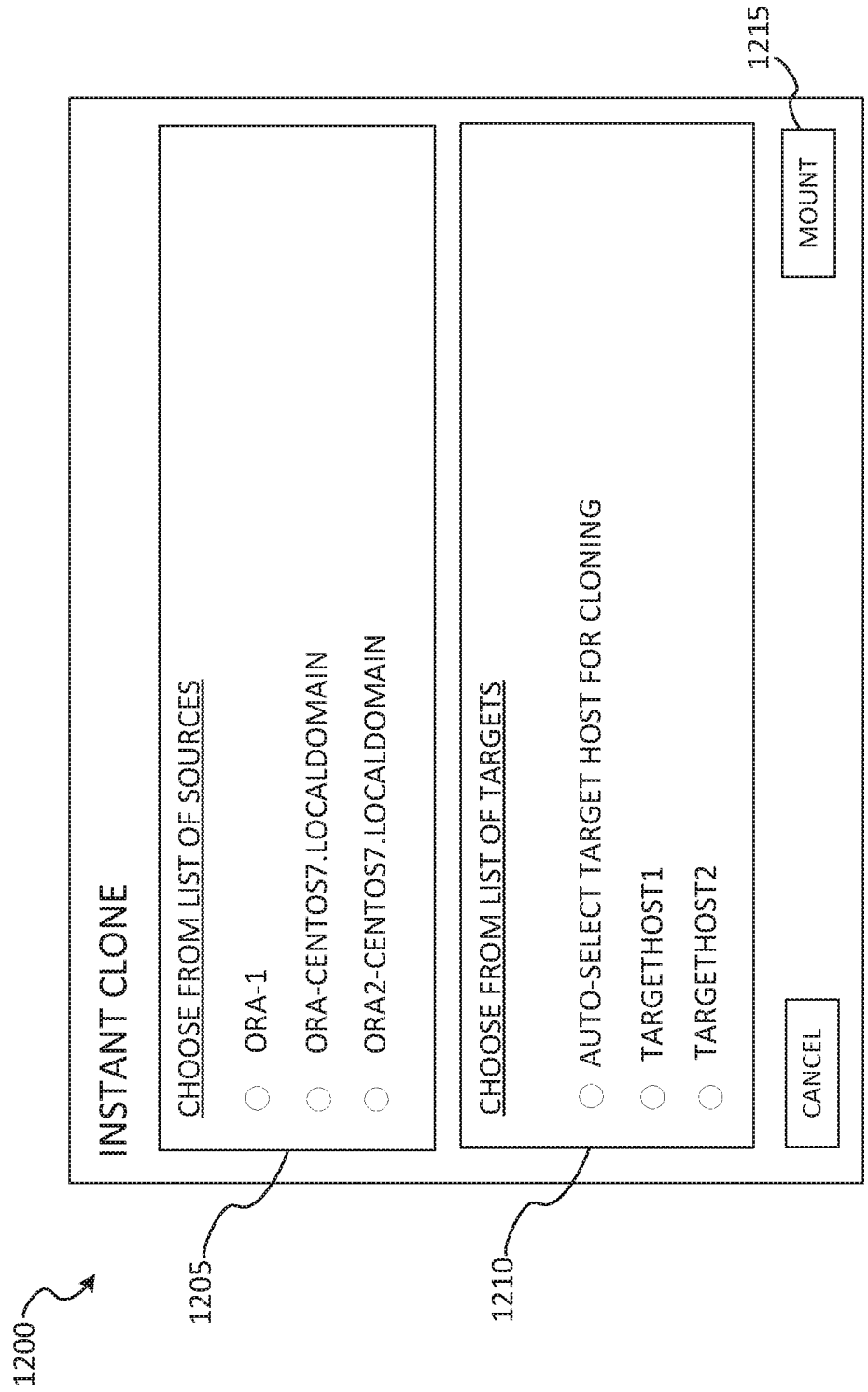
FIG. 12 shows an example user interface for performing cloning using a cluster, according to some example embodiments.

FIG. 12 shows an example user interface 1100 for implementing instant recovery using a cluster, according to some example embodiments. In the user interface 1100, a database administrator can use a timeline element 1105 to select a time point to which a malfunctioning database 1110 is to be instantly recovered via a live mount cluster, as discussed above. As shown in the example user interface 1100, in response to identifying that the database is malfunctioning (e.g., via "STATUS: DOWN" indicator), the database administrator can right click on the database to generate pop-up 1115 and select option 1120 instantly recover the database via the preconfigured templates to generate the scripts which are executed on the host without delays due to file migrations.

FIG. 12 shows an example user interface 1200 for performing cloning using a cluster, according to some example embodiments. In the example interface 1200, a database administrator can select one of the plurality of databases 1205 to clone, and further select a target device from the available target devices 1210, and then select a mount button 1215 to create a clone of the selected database via the cluster live mounting system discussed above.

Figure 13:
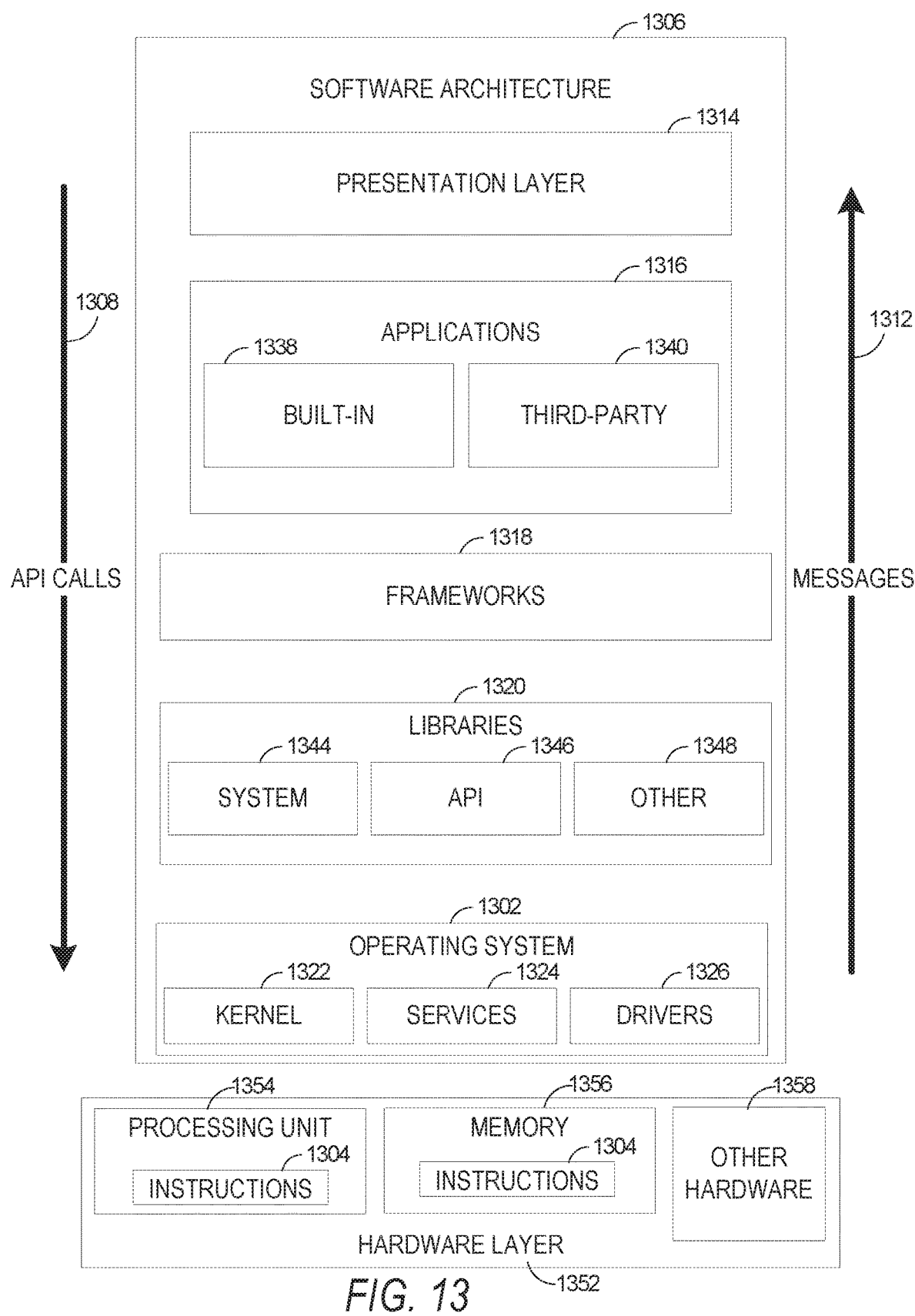
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors, memory, and I/O components. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response in the form of messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1314. In these systems, the application/component "logic" can be separated from the aspects of the application/component that interact with a user.

Figure 14:
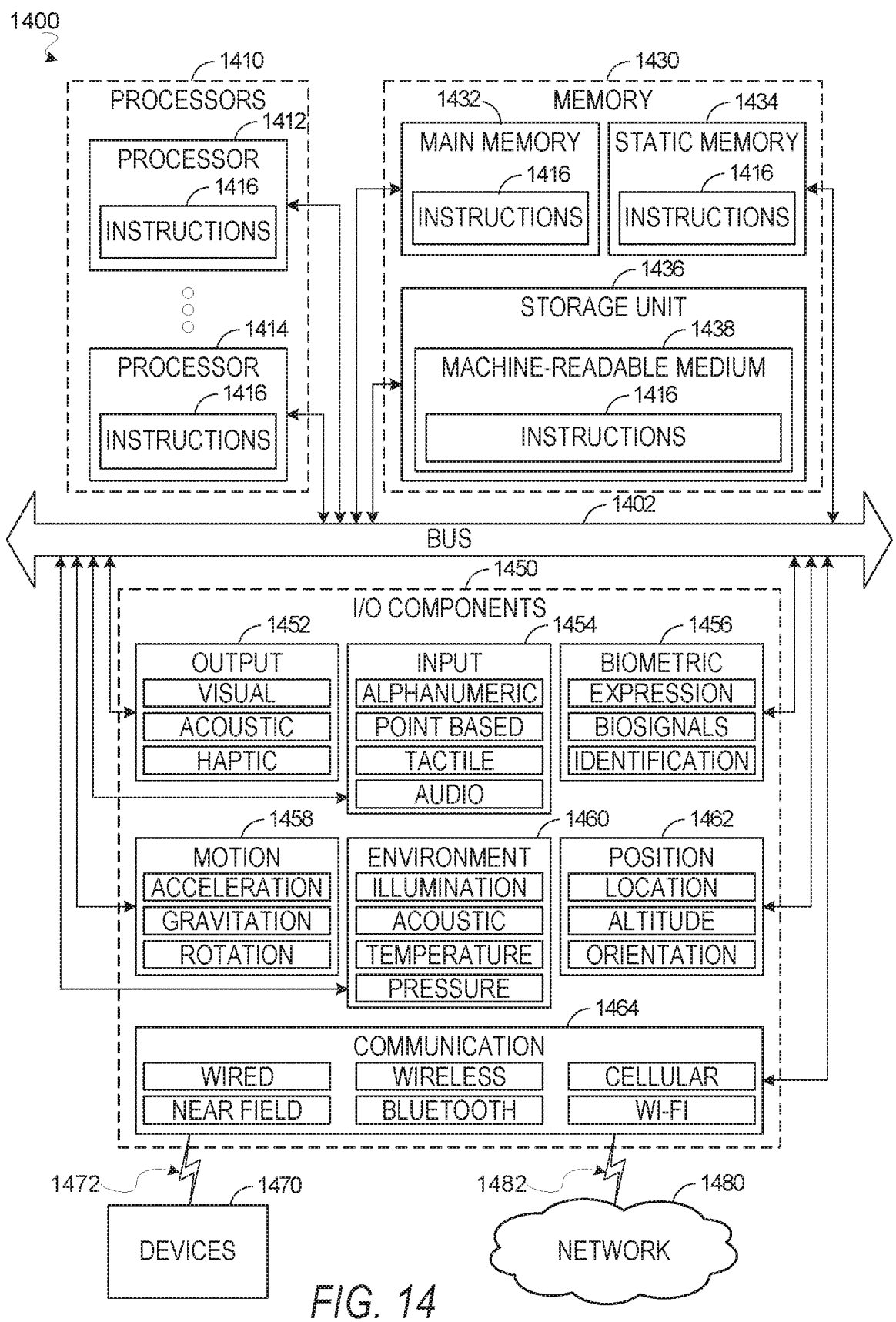
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, air app, or other executable code) for causing the machine 1400 to perform any one or more of the methodologies discussed herein may be executed. As such, the instructions 1416 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. The memory/storage 1430 may include a main memory 1432, static memory 1434, and a storage unit 1436, both accessible to the processors 1410 such as via the bus 1402. The storage unit 1436 and main memory 1432 store the instructions 1416 embodying any one or more of the methodologies or functions described herein. The instructions 1416 may also reside, completely or partially, within the static memory 1434, within the storage unit 1436 (e.g., on machine readable-medium 1438), within at least one of the processors 1410 (e.g., within the processor cache memory accessible to processors 1412 or 1414), or any suitable combination thereof, during execution thereof by the machine 1400. Accordingly, the main memory 1432, static memory 1434, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a network 1480 to obtain resources from one or more server systems or other client devices (e.g., client device). A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling 1482 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation. Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1412 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1412 configured by software to become a special-purpose processor, the general-purpose processor 1412 may be configured as respectively different special-purpose processors (e.g., comprising different hardware components) at different times. Software accordingly configures a particular processor 1412 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1412 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1460 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1412) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors 1412, 1414 (sometimes referred to as "cores") that may execute instructions 1416 contemporaneously.

"TIMESTAMP" in this context refers to a sequence of characters or encoded information identifying when a certain event occurred, for example giving date and time of day, sometimes accurate to a small fraction of a second.

What is claimed is:
1. A method comprising:
identifying a database on a source host;
storing, in file nodes of a remote cluster, directories of the database, each of the file nodes mapped to a directory of the database;
receiving an instruction to clone the database to a target host;
storing, in a script node of the remote cluster, a plurality of scripts for execution on the target host to clone the database to the target host;
processing, by a remote agent on the target host, the plurality of scripts to clone the database to the target host using the directories mapped to the file nodes; and
processing one or more requests received by the target host using the target host as mapped to the file nodes of the remote cluster.

2. The method of claim 1, further comprising:
generating a preconfigured template comprising a plurality of placeholder values of configuration parameters of the database, the preconfigured template specifying an order of execution of the plurality of scripts; and
executing the preconfigured template to generate the plurality of scripts on the target host.

3. The method of claim 2, wherein the script node comprises a script repository and the plurality of scripts are a subset of scripts available in the script repository, which scripts to include from the script repository in the plurality of scripts being specified by the preconfigured template.

4. The method of claim 2, further comprising:
retrieving the configuration parameters and replacing the plurality of placeholder values to generate the plurality of scripts, the plurality of scripts being in a format that is natively executable on the target host.

5. The method of claim 1, wherein the file nodes are mapped to the directory of the database using Network File System (NFS) mounting.

6. The method of claim 1, wherein the one or more requests are received from end-users of a network service that interfaces with the database.

7. The method of claim 1, wherein the remote cluster is a non-SQL database cluster.

8. The method of claim 1, further comprising:
causing display of a user interface comprising a user interface element for specifying a target host device as the target host.

9. The method of claim 8, further comprising:
receiving, from the user interface element, specification of the target host device; and
setting a target host value in the plurality of scripts based at least in part on the specification of the target host device.

10. The method of claim 1, wherein the target host is a target host device that is automatically selected from one or more available target host devices.

11. The method of claim 10, further comprising:
installing a test application on the database of the target host; and
storing error data generated by the test application operating on the target host.

12. The method of claim 1, wherein the remote agent on the target host accesses the plurality of scripts on the script node through an NFS mount, and the plurality of scripts are executed by the remote agent on the target host.

13. The method of claim 1, wherein the plurality of scripts are executable code portions in a script data file.

14. A system comprising:
one or more processors of a machine; and a memory storing instructions that, when executed by the one or more processors, cause the machine to perform operations comprising:
identifying a database on a source host;
storing, in file nodes of a remote cluster, directories of the database, each of the file nodes mapped to a directory of the database;
receiving an instruction to clone the database to a target host;
storing, in a script node of the remote cluster, a plurality of scripts for execution on the target host to clone the database to the target host;
processing, by a remote agent on the target host, the plurality of scripts to clone the database to the target host using the directories mapped to the file nodes; and
processing one or more requests received by the target host using the target host as mapped to the file nodes of the remote cluster.

15. The system of claim 14, the operations further comprising:
generating a preconfigured template comprising a plurality of placeholder values of configuration parameters of the database, the preconfigured template specifying an order of execution of the plurality of scripts; and
executing the preconfigured template to generate the plurality of scripts on the target host.

16. The system of claim 15, wherein the script node comprises a script repository and the plurality of scripts are a subset of scripts available in the script repository, which scripts to include from the script repository in the plurality of scripts being specified by the preconfigured template.

17. The system of claim 15, the operations further comprising:
retrieving the configuration parameters and replacing the plurality of placeholder values to generate the plurality of scripts, the plurality of scripts being in a format that is natively executable on the target host.

18. The system of claim 14, wherein the file nodes are mapped to the directory of the database using Network File System (NFS) mounting.

19. A machine-readable storage medium embodying instructions that, when executed by a machine, cause the machine to perform operations comprising:
identifying a database on a source host;
storing, in file nodes of a remote cluster, directories of the database, each of the file nodes mapped to a directory of the database;
receiving an instruction to clone the database to a target host;
storing, in a script node of the remote cluster, a plurality of scripts for execution on the target host to clone the database to the target host;
processing, by a remote agent on the target host, the plurality of scripts to clone the database to the target host using the directories mapped to the file nodes; and
processing one or more requests received by the target host using the target host as mapped to the file nodes of the remote cluster.

20. The method of claim 1, wherein identifying the database on the target host comprises:
identifying that the directories of the database are mounted to the source host and files of the database are stored in the file nodes of the remote cluster and accessible via the source host, wherein after processing the plurality of scripts stored in the script node of the remote cluster, the directories of the database are mounted to the target host such that the files stored in the file nodes of the remote cluster are accessible via the target host.

* * * * *